(12) United States Patent
Swart et al.

(10) Patent No.: US 8,601,217 B2
(45) Date of Patent: Dec. 3, 2013

(54) METHOD AND SYSTEM FOR INSERTING CACHE BLOCKS

(75) Inventors: Garret Frederick Swart, Palo Alto, CA (US); David Vengerov, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 394 days.

(21) Appl. No.: 13/007,553

(22) Filed: Jan. 14, 2011

(65) Prior Publication Data

US 2012/0054445 A1   Mar. 1, 2012

Related U.S. Application Data

(60) Provisional application No. 61/378,780, filed on Aug. 31, 2010.

(51) Int. Cl.
*G06F 13/00* (2006.01)

(52) U.S. Cl.
USPC .................................. 711/133; 711/E12.075

(58) Field of Classification Search
USPC .......................................................... 711/133
See application file for complete search history.

(56) References Cited

U.S. PATENT DOCUMENTS

| | | | | |
|---|---|---|---|---|
| 5,073,885 | A * | 12/1991 | Ito et al. ..................... | 369/44.28 |
| 5,608,890 | A * | 3/1997 | Berger et al. ................. | 711/113 |
| 5,761,717 | A | 6/1998 | Vishlitzky et al. | |
| 6,378,043 | B1 * | 4/2002 | Girkar et al. .................. | 711/133 |
| 6,385,699 | B1 | 5/2002 | Bozman et al. | |
| 6,418,510 | B1 | 7/2002 | Lamberts | |
| 6,609,177 | B1 | 8/2003 | Schlumberger et al. | |
| 6,728,837 | B2 * | 4/2004 | Wilkes et al. ................. | 711/133 |
| 6,760,812 | B1 * | 7/2004 | Degenaro et al. ............. | 711/133 |
| 2003/0088739 | A1 | 5/2003 | Wilkes et al. | |
| 2005/0097278 | A1 * | 5/2005 | Hsu et al. ...................... | 711/129 |
| 2009/0172315 | A1 | 7/2009 | Iyer et al. | |
| 2010/0082907 | A1 * | 4/2010 | Deolalikar et al. ........... | 711/133 |

OTHER PUBLICATIONS

Qureshi, Monuddin; 'Adaptive Insertion Policies for High Performance Caching' ISCA'07. Jun. 9-13, 2007, San Diego California, USA Copyright 2007 ACM 978-1-59593-706-3/07/0006 Appendix: p. 10.*

Jeong, J. et al, "Simple Penalty-Sensitive Cache Replacement Policies," Journal of Instruction-Level Parallelism 10, 2008 (24 pages).

Jiang, S. et al, "Making LRU Friendly to Weak Locality Workloads: A Novel Replacement Algorithm to Improve Buffer Cache Performance," IEEE Transactions on Computers vol. 54, No. 8, 2008 (14 pages).

(Continued)

*Primary Examiner* — Edward Dudek, Jr.
*Assistant Examiner* — Sean D Rossiter
(74) *Attorney, Agent, or Firm* — Osha Liang LLP

(57) ABSTRACT

A method of inserting cache blocks into a cache queue includes detecting a first cache miss for the cache queue, identifying a storage block receiving an access in response to the cache miss, calculating a first estimated cache miss cost for a first storage container that includes the storage block, calculating an insertion probability for the first storage container based on a mathematical formula of the first estimated cache miss cost, randomly selecting an insertion probability number from a uniform distribution, and inserting, in response to the insertion probability exceeding the insertion probability number, a new cache block corresponding to the storage block into the cache queue.

19 Claims, 15 Drawing Sheets

(56) References Cited

OTHER PUBLICATIONS

Johnson, T. et al, "2Q: A Low Overhead High Performance Buffer Management Replacement Algorithm," Proceedings of the 20th International Conference on Very Large Data Bases, 1994 (12 pages).
Karedla, R. et al, "Caching Strategies to Improve Disk System Performance," Computer vol. 27, No. 3, 1994 (9 pages).
Li, Z. et al, "CRFP: A Novel Adaptive Replacement Policy Combined the LRU and LFU Policies," Proceedings of the 2008 IEEE 8th International Conference on Computer and Information Technology Workshops, 2008 (8 pages).
Megiddo, N. et al, "ARC: A Self-Tuning, Low Overhead Replacement Cache," Proceedings of the 2nd USENIX Conference on File and Storage Technologies, 2003 (17 pages).
Rizzo, L. et al, "Replacement Policies for a Proxy Cache," IEEE/ACM Transactions on Networking, vol. 8, No. 2, 2000 (13 pages).
Wan, S. et al, "An Adaptive Cache Management Using Dual LRU Stacks to Improve Buffer Cache Performance," Proceedings of the 27th IEEE International Performance Computing and Communication Conference, 2008 (8 pages).
Rubner, Y. et al, "A Metric for Distributions with Applications to Image Databases," Proceedings of the 6th International Conference on Computer Vision, 1998 (8 pages).
Gray, J. et al, "The 5 Minute Rule for Trading Memory for Disc Accesses and the 10 Byte Rule for Trading Memory for CPU Time," Technical Report TR86.1, Tandem Computers, 1985 (7 pages).
International Search Report issued in PCT/US2011/049871 mailed on Dec. 20, 2011, (4 pages).
Written Opinion issued in PCT/US2011/049871, mailed on Dec. 20, 2011, (6 pages).
Invitation to Pay Additional Fees issued in PCT/US2011/049875, mailed on Dec. 16, 2011, (7 pages).
International Search Report issued in PCT/US2011/049875, mailed on Apr. 3, 2012 (7 pages).
Written Opinion issued in PCT/US2011/049875, mailed on Apr. 3, 2012 (10 pages).

\* cited by examiner

Old Block Shadow List 849

| 800 Cache Block Entry A | 802 Cache Block Entry B | 804 Cache Block Entry C | ... | 806 Cache Block Entry J | 808 Cache Block Entry J+1 | 810 Cache Block Entry J+2 |

*FIG. 8A*

New Block Shadow List 899

| 850 Cache Block Entry A | 852 Cache Block Entry B | 854 Cache Block Entry C | ... | 856 Cache Block Entry J | 858 Cache Block Entry J+1 | 860 Cache Block Entry J+2 |

*FIG. 8B*

METHOD AND SYSTEM FOR INSERTING CACHE BLOCKS

CROSS-REFERENCE TO RELATED APPLICATIONS

This application claims benefit under 35 U.S.C. §119(e) of filing date of U.S. Provisional Application Ser. No. 61/378,780 entitled "METHOD AND SYSTEM FOR REPLACING CACHE BLOCKS," filed on Aug. 31, 2010.

This application is related to co-pending U.S. patent application Ser. No. 13/007,539 entitled "METHOD AND SYSTEM FOR REMOVING CACHE BLOCKS," filed on Jan. 14, 2011, having the same Assignee.

BACKGROUND

As computer processing power increases, the demands of technology users and applications also increase. For many industries, this has led to a rapid shift in resource prioritization. For example, the relative importance and cost of non-volatile storage capacity has decreased drastically in many relational database applications. For system administrators, concerns about storage capacity have shifted to those of performance and reliability as transactional delays for storage technology limit the potential benefit of faster and more powerful microprocessors.

Within the semiconductor industry, a similar parallel exists. Theoretical gains in processing power and computational speed following Moore's law are severely limited by non-CPU bottlenecks such as memory access speeds. As researchers search for the next paradigm-shifting storage technology, intermediary technologies such as improved caching methodologies have helped to bridge the gap. By utilizing multiple types of cache storage devices across a spectrum of different applications, the bottleneck of access latencies can be reduced for certain applications.

The study of cache design and caching algorithms has led to an increase in the complexity of caches and cache management devices. For everything from CPU caches to disk caches and database caches, cache systems have become increasingly important in overall system performance and across every layer of the computing spectrum. Cache algorithms deal primarily with insertion, removal, and modification of cache data items. The relevancy and prioritization of cached data is paramount to the efficient operation of a cache. By keeping frequently used data items in the cache, and evicting those which are less likely to be used in the future, traditional caching algorithms aim to increase the cache hit ratio and performance.

SUMMARY

In general, in one aspect, the invention relates to a method of inserting cache blocks into a cache queue. The method includes detecting a first cache miss for the cache queue, identifying a storage block receiving an access in response to the cache miss, calculating a first estimated cache miss cost for a first storage container that includes the storage block, calculating an insertion probability for the first storage container based on a mathematical formula of the first estimated cache miss cost, randomly selecting an insertion probability number from a uniform distribution, and inserting, in response to the insertion probability exceeding the insertion probability number, a new cache block corresponding to the storage block into the cache queue.

In general, in one aspect, the invention relates to a method of inserting cache blocks into a cache queue. The method includes calculating an estimated cache miss cost for a cache block within the cache queue, evicting the cache block from the cache queue, and inserting an entry for a storage block corresponding to the cache block into a shadow list corresponding to the cache queue. The method further includes detecting a cache miss for the cache queue referencing the storage block, accessing, in response to the cache miss, the entry within the shadow list, calculating, based on a mathematical formula of a plurality of estimated old cache miss costs for cache blocks evicted from the cache queue, an estimated cache miss cost threshold, and inserting, in response to the estimated cache miss cost exceeding the estimated cache miss cost threshold, a new cache block corresponding to the storage block into the cache queue.

In general, in one aspect, the invention relates to a computer readable storage medium storing instructions for inserting cache blocks into a cache queue. The instructions include functionality to detect a cache miss for the cache queue, identify a storage block receiving an access in response to the cache miss, calculate a first estimated cache miss cost for a first storage container that includes the storage block, calculate, based on a mathematical formula of the first estimated cache miss cost, an insertion probability for the first storage container, and randomly select an insertion probability number from a uniform distribution. Further, the instructions include functionality to insert, in response to the insertion probability exceeding the insertion probability number, a new cache block corresponding to the storage block into the cache queue.

In general, in one aspect, the invention relates to a system for inserting cache blocks. The system includes a cache queue that includes a probationary segment at an end of the cache queue, and a protected segment adjacent to the probationary segment. The system further includes a cache manager executing on a processor and is configured to detect a cache miss for the cache queue, identify a storage block receiving an access in response to the cache miss, calculate an estimated cache miss cost for a storage container that includes the storage block, calculate, based on a mathematical formula of the estimated cache miss cost, an insertion probability for the storage container, randomly select a probability number from a uniform distribution, and insert, in response to the insertion probability exceeding the probability number, a new cache block corresponding to the storage block into the cache queue at a beginning of the probationary segment.

Other aspects of the invention will be apparent from the following description and the appended claims.

BRIEF DESCRIPTION OF DRAWINGS

FIGS. 8A and 8B depict schematic block diagrams of a system in accordance with one or more embodiments of the invention.

DETAILED DESCRIPTION

Figure 1A:
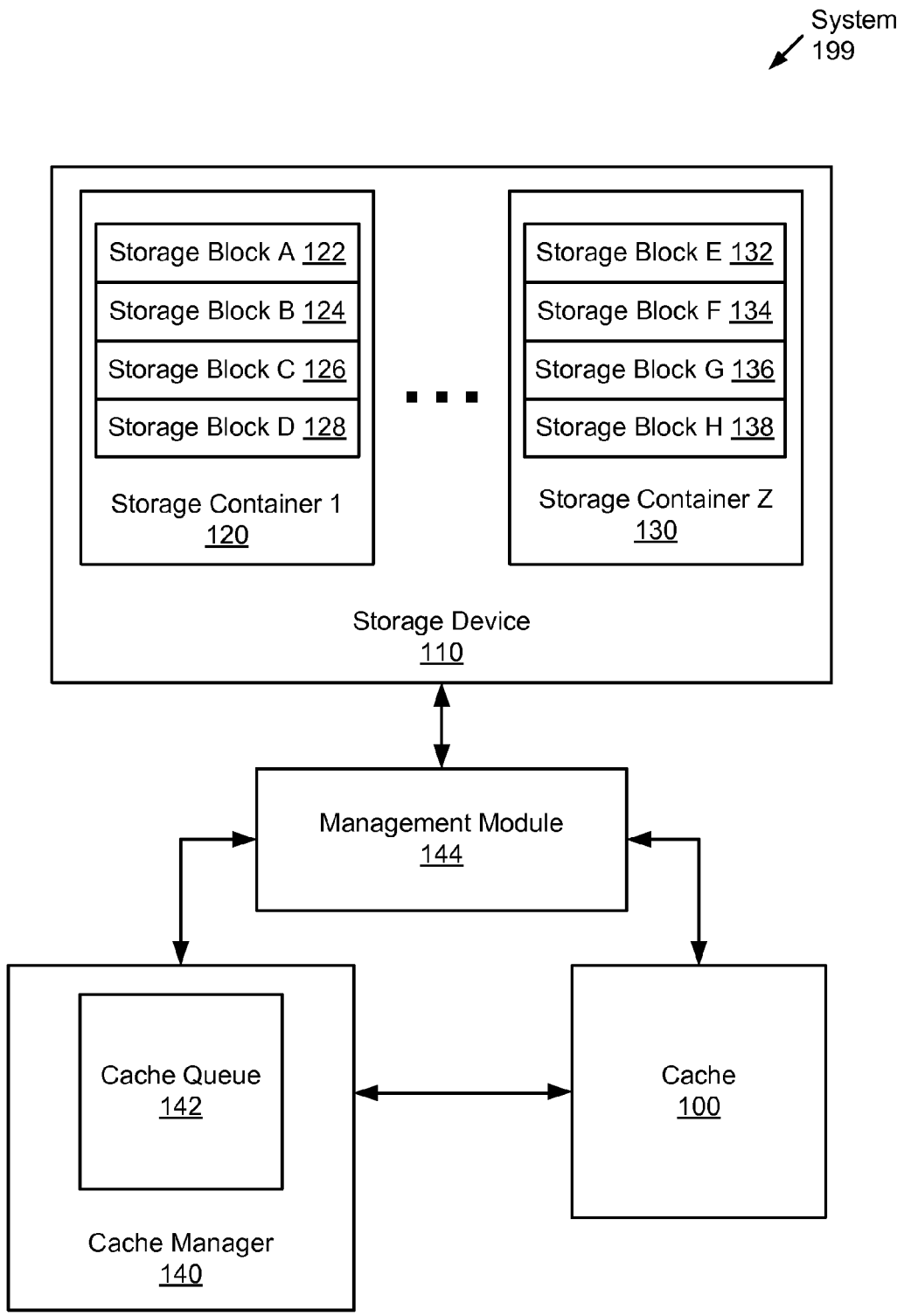
FIGS. 1A and 1B depict schematic block diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing a cache. Specifically, embodiments of the invention assign an estimated cache miss cost to a storage container. The estimated cache miss cost is an estimation of the cost of a cache miss for a storage block within the storage container. The estimated cache miss cost may be used to probabilistically insert a new cache block corresponding to the storage block into the cache queue.

For purposes of this disclosure, a cache operation may refer to any access to and/or modification of a cache. Examples of a cache operation may include but are not limited to a read operation, a write operation, a write-back operation, any type of cache hit, any type of cache miss, and/or any number of other cache operations. In one or more embodiments of the invention, a cache operation may refer to any cache request which cause one or more cache blocks in a cache queue to be recycled. Recycling may refer to any backward movement of one or more cache blocks within the cache queue. A cache operation and/or access of a storage container may refer to an access of a storage block within the storage container.

For purposes of this disclosure, a cache miss may refer to a cache operation requesting a read or write of a storage block which does not exist in the cache (and/or an associated cache queue, if applicable). Thus, in one or more embodiments of the invention, the storage block is read directly from a corresponding storage device and subsequently inserted into the cache. In one or more embodiments of the invention, the cache miss may refer to a write miss, a read miss, and/or some combination of write and read requests requiring access to a storage block not currently stored within the cache.

For purposes of this disclosure, a cache hit may refer to a cache operation accessing a storage block which is currently stored in the cache (and an associated cache queue, if applicable). According to various embodiments of the invention, a cache hit may include modification of a cache queue corresponding to the cache. A "read" cache hit may refer to a request to read the contents of a memory unit within the cache. A "write" cache hit may refer to a request to write a value from a memory unit in the cache to a corresponding storage block in a storage device. In one or more embodiments of the invention, the write operation may be performed by writing said value to the memory unit without modifying the storage block (e.g., in a write-back cache). Then, at some predetermined time or after an event trigger, the value may be written back to the storage block.

For purposes of this disclosure, an old cache block is a cache block which has received at least one cache hit since being inserted into the cache queue. A new cache block refers to a cache block which has not received a cache hit since being inserted into the cache queue.

FIG. 1A shows a system (199) in accordance with one embodiment of the invention. As shown in FIG. 1A, the system (199) has multiple components including a cache (100), a storage device (110), a set of storage containers (e.g., storage container 1 (120), storage container Z (130)), a set of storage blocks (e.g., storage block A (122), storage block B (124), storage block C (126), storage block D (128), storage block E (132), storage block F (134), storage block G (136), storage block H (138)), a cache manager (140), a cache queue (142), and a management module (144). The components of the system (199) may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the cache (100) is a memory module having one or more memory units. Each memory unit (not shown) within the cache (100) may store one or more values of a referenced storage block (e.g., storage block A (122), storage block B (124), storage block C (126), storage block D (128), storage block E (132), storage block F (134), storage block G (136), storage block H (138)) in a storage device (110). A value of the memory unit is referred to as "dirty" if it differs from the value of the referenced storage block. Thus, a storage block (e.g., storage block A (122), storage block B (124), storage block C (126), storage block D (128), storage block E (132), storage block F (134), storage block G (136), storage block H (138)) is referred to as "cached" and/or "stored" within the cache (100) if it is referenced by a memory unit in the cache (100) and/or if a cache block referencing the storage block is stored within a corresponding cache queue.

The cache (100) may include a cache address space having one or more cache addresses for each memory unit. Thus, in one or more embodiments of the invention, each memory unit may have a cache address, a reference field storing an address of a storage block, and/or a value field storing a value for the storage block. The cache (100) may be a memory device and/or a portion of one or more memory devices. In one or more embodiments of the invention, the cache may be implemented as a middle layer of abstraction between a storage device and one or more applications and/or devices (hereinafter "a requester"). In this way, values requested from the storage device may be stored within the cache (100) as an intermediary and provided to the requester. Later accesses by the requestor to the values in the storage block may be performed without accessing the storage device.

Continuing with FIG. 1A, the cache (100) may constitute a portion of memory on one or more hard disk drives and/or any other form of volatile and/or non-volatile memory. An example of a cache stored in volatile memory is a designated portion or amount of random access memory (RAM) within a computer system. The designated RAM memory may be used to store one or more values from a hard disk drive or other storage device for faster access. In one or more embodiments of the invention, the cache (100) is a distributed cache spread across one or more physical storage devices connected by a network. The memory device may be modified dynamically such that the size of the cache grows or shrinks with the addition and/or removal of one or more memory units.

In one or more embodiments of the invention, the cache (100) has a lower access latency (e.g., read and/or write latency) than one or more corresponding storage devices. The number of memory units in the cache may also be smaller than the number of storage blocks in the storage device. Thus, in one or more embodiments of the invention, memory units in the cache are removed, inserted, and/or modified in accordance with one or more cache algorithms. A cache algorithm may include synchronous and/or asynchronous steps for any operation related to the cache. Synchronous operation may coincide with one or more periodic events and/or instructions (e.g., tied to a system clock) while asynchronous operation may refer to operations executed on demand and/or outside of a synchronous time window.

Examples of a cache (100) may include but are not limited to a CPU cache, disk cache, database cache, victim cache, web cache, write-back cache, no-write cache, database buffer pool, DRAM cache, flash cache, a storage cache (e.g., as part of ORACLE Corporation's EXADATA® line of storage server products), an operating system buffer pool, and/or an object cache corresponding to a middle tier cache. EXADATA® is a registered trademark of the Oracle Corporation, Redwood City, Calif. In one example, the cache (100) resides on a hard disk drive and is used by a virtual memory management module to store page tables having virtual addresses corresponding to physical addresses on one or more other storage devices (e.g., a RAM). In this example, the memory units are virtual addresses storing one or more storage blocks from real (i.e., physical) memory.

In another example, the cache (100) is a data structure residing within a storage device. Thus, the cache (100) itself may be a virtual cache designed to store content from a physical or virtual memory device based on one or more caching algorithms. In another example, a CPU cache is a memory device installed on a motherboard (i.e., a printed circuit board) and operatively connected to a central processing unit (CPU) by means of a bus. In this example, the cache is implemented using static random access memory (SRAM) on a memory chip.

In another example, an enterprise resource planning (ERP) system using a company database is implemented using three tier architecture. The company database is implemented on a separate host (i.e., the data tier) from the ERP applications. In order to increase database performance by decreasing network traffic, a lightweight database is installed on the application tier host and configured to cache data for the company database. Thus, the cache is implemented on a group of local hard disk drives on the application tier host storing the lightweight database. In this example, memory units may correspond to a database table, row, or field.

In one or more embodiments of the invention, the storage device (110) is a memory device. Examples of a storage device may include, but are not limited to, a hard disk drive, a random access memory (RAM), a flash memory module, a tape drive, an optical drive, and/or any combination of storage devices. In one or more embodiments of the invention, the storage device (110) includes storage blocks (e.g., storage block A (122), storage block B (124), storage block C (126), storage block D (128), storage block E (132), storage block F (134), storage block G (136), storage block H (138)).

Continuing with FIG. 1A, in one or more embodiments of the invention, a storage block may be any logical and/or physical segment of memory within the storage device. Each storage block may be addressable, meaning it may be accessed based on some predefined addressing method or schema. Examples of a storage block may include, but are not limited to, a bit, a memory byte, a memory word, a register, a slab, a database record, a database field, a hypertext markup language (HTML) page, a database reference, a file, and/or any addressable segment of data within the storage device. In accordance with various embodiments of the invention, the size of storage blocks within a storage device may be fixed (i.e., uniform across all storage blocks) or variable (e.g., depending on the size of the contents of the storage block).

In one or more embodiments of the invention, storage blocks (e.g., storage block A (122), storage block B (124), storage block C (126), storage block D (128), storage block E (132), storage block F (134), storage block G (136), storage block H (138)) may be grouped into storage containers (e.g., storage container 1 (120), storage container Z (130)). In one or more embodiments of the invention, a storage container may refer to a logical and/or physical grouping of storage blocks within the storage device. Examples of a storage container may include but are not limited to a file, a database record, a database field, an HTML page, a database reference, a memory byte, a memory word, a register, a slab, and/or any grouping of one or more storage blocks within the storage device. In one example, the storage containers are files residing on a hard disk drive, while the storage blocks are memory bytes on said hard disk drive. In another example, a storage container is a database row and its corresponding storage blocks are database fields within the database row. As shown in the examples, the storage container may be a grouping of only and all storage blocks on a particular hardware device, a grouping of only and all storage blocks that a particular table or a particular database, or any other logical or physical grouping.

In accordance with various embodiments of the invention, the size of storage containers within a storage device may be fixed (i.e., uniform across all storage containers) or variable (e.g., depend on the size of the contents of the storage container). Further, the number of storage blocks in a storage container may be fixed or variable. In one or more embodiments of the invention, storage containers are addressable. Data may be stored within one or more storage blocks across one or more storage containers based on any storage schema and/or algorithm. Thus, storage blocks within a storage container may correspond to the same logical unit and/or may be related according to their usage within a software program. The contents of the storage device (110) may be used by any type of computer and/or device capable of reading said storage device (110) and may be fragmented or stored in any logical order.

In one or more embodiments of the invention, the cache manager (140) includes functionality to manage the cache (100) and the cache queue (142). The cache manager (140) may control insertion, deletion, and/or modification of cache blocks within the cache queue (142). The cache manager (140) may also perform operations such as insertion, deletion, and/or modification of memory units within the cache (100) and/or request said operations to be performed by another entity (e.g., a cache controller). In one or more embodiments of the invention, the cache manager (140) may implement a cache algorithm such as one or more of the methods disclosed herein. Examples of a cache algorithm may include but are not limited to Least Recently Used (LRU), Most Recently Used (MRU), and/or any combination of one or more methods describing the steps of insertion, removal, and/or modification of the cache and/or cache queue (142).

Continuing with FIG. 1A, in one or more embodiments of the invention, the cache manager (140) may correspond to hardware, software, or a combination thereof. For example, the cache manager (140) may be implemented as part of a database buffer pool manager (e.g. the database kernel) to manage both DRAM and flash cache, as a memory management unit operatively connected to a hardware cache, as part of a storage server to manage a storage cache (e.g., as part of Oracle Corporation's EXADATA® line of storage server products), as part of a ZFS appliance cache manager managing both the DRAM and flash cache (readzilla), as part of the operating system to manage an operating system buffer pool, and/or as part of an object cache to manage which objects are to be maintained in a middle tier cache. The aforementioned components are only examples of components in which the cache manager (140) may be implemented. Other hardware or software components may be used without departing from the scope of the invention.

In one or more embodiments of the invention, the cache manager (140) controls synchronization of cache operations with one or more periodic events (e.g., a system clock). The cache manager (140) may also control periodic and/or asynchronous operations such as write-back to the storage device (110) based on one or more periodic events and/or triggers (e.g., lazy write). The cache manager (140) may be an intermediary between the storage device (110) and a requesting entity. Examples of a requesting entity include but are not limited to a software program, a CPU, and/or any entity capable of requesting data from and/or writing data to the storage device (110). Thus, the cache manager (140) may receive instructions from a requesting entity (e.g., a read and/or write instruction) and may retrieve from and/or write data to the cache (100), cache queue (142), and/or storage device.

Figure 1B:
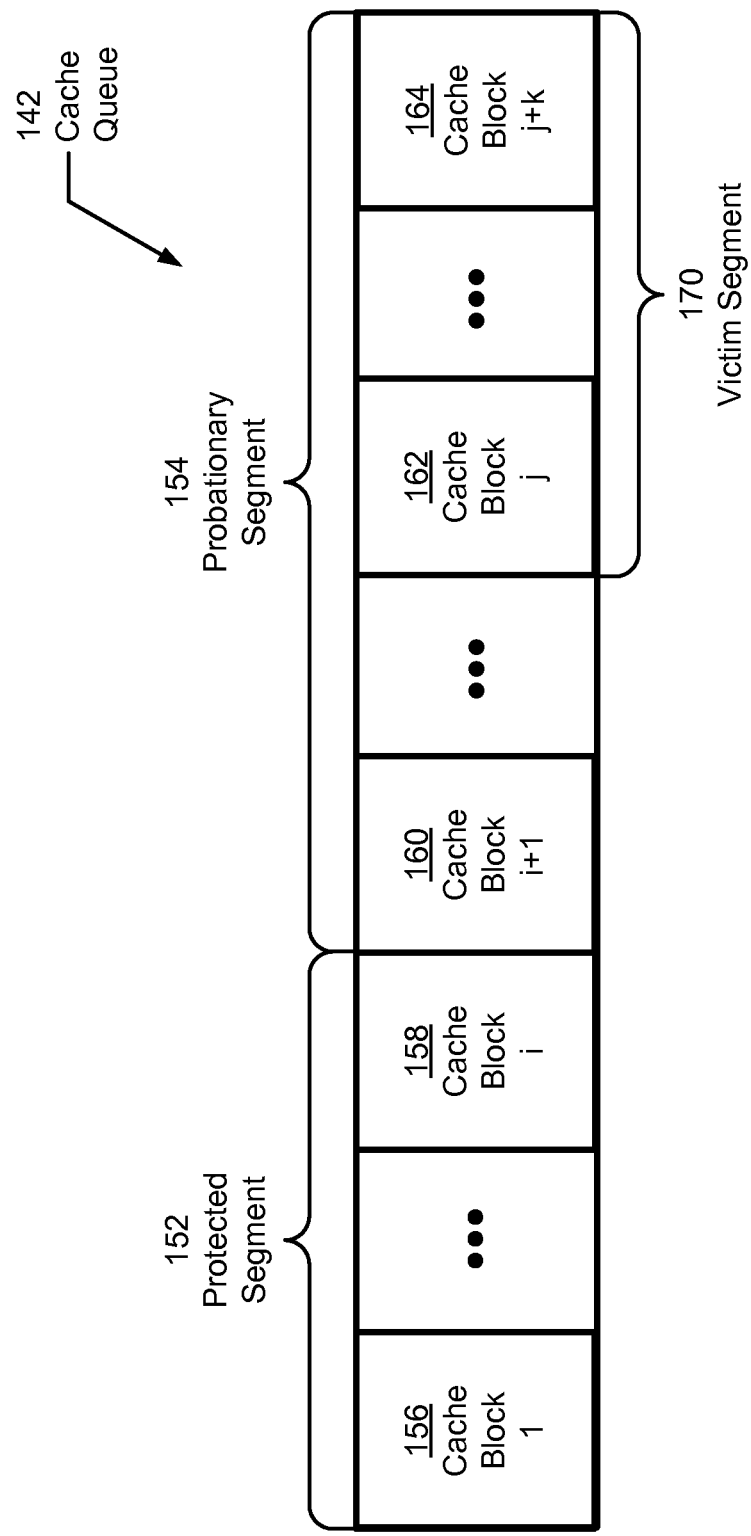

FIG. 1B shows a cache queue (142) in accordance with one embodiment of the invention. As shown in FIG. 1B, the system has multiple components including multiple cache blocks (e.g., cache block 1 (156), cache block i (158), cache block i+1 (160), cache block j (162), cache block j+k (164)), a protected segment (152), a probationary segment (154), and a victim segment (170). The components of the system may be located on the same device (e.g. a hard disk drive, RAM, storage device, memory management unit (MMU), server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the cache queue (142) is a queue of cache blocks (e.g., cache block 1 (156), cache block i (158), cache block i+1 (160), cache block j (162), cache block j+k (164)). Each cache block (e.g., cache block 1 (156), cache block i (158), cache block i+1 (160), cache block j (162), cache block j+k (164)) in the cache queue (142) may reference one or more memory units within the cache. The cache queue (142) may be a virtual structure (e.g., a data structure in memory), a physical structure implemented on a storage device (e.g., a static random access memory device), and/or any combination thereof.

In one or more embodiments of the invention, the value of a cache block references the location of the corresponding memory unit in the cache. Thus, a cache block may be a logical entity referencing a physical memory unit which stores the value of the storage block. The referencing may be in the form of being located in a storage location of the memory unit, storing a storage location of the physical memory unit, or using another direct or indirect technique for identifying the referenced memory unit. In accordance with one or more embodiments of the invention, insertion of a cache block into the cache queue coincides with the insertion of the storage block's value into a memory unit in the cache such that the cache block references the memory unit.

In one or more embodiments of the invention, when one or more cache blocks are repositioned within the cache queue (142), their corresponding memory units are not moved within the cache. Thus, the order of the cache blocks within the cache queue (142) may not reflect the order of memory units within the cache. In one or more embodiments of the invention, when a storage block is selected for insertion into the cache, a value corresponding to a different storage block is evicted from the cache. In one or more embodiments of the invention, for a dynamically resized cache, the size of the cache queue (142) grows proportionally with the cache.

Continuing with FIG. 1B, in one or more embodiments of the invention, the cache queue (142) includes a victim segment (170) positioned at the end of the cache queue (142). The victim segment (170) is a contiguous set of cache blocks which constitute a subset of the cache queue (142). Cache blocks within the victim segment (170) may be candidates for eviction from the cache queue (142). Cache blocks not in the victim segment (170) are not candidates for eviction from the cache queue (142) in one or more embodiments of the invention. Thus, in one or more embodiments of the invention, prior to an insertion into the cache, the cache queue (142) evicts a cache block from the victim segment (170) when there is insufficient space in the cache queue for a new cache block.

In one or more embodiments of the invention, the cache queue (142) includes a probationary segment (154) at the end of the cache queue (142). The probationary segment (154) is a contiguous set of cache blocks which constitute a subset of the cache queue (150). In one or more embodiments of the invention, the probationary segment (154) includes the victim segment (170) such that the victim segment (170) is a subset of the probationary segment (154). The probationary segment (154) may include one or more new cache blocks and/or one or more old cache blocks. In one or more embodiments of the invention, new cache blocks are inserted into the cache queue (142) at the beginning of the probationary segment (154).

In one or more embodiments of the invention, the cache queue (142) includes a protected segment (152) at the beginning of the cache queue (142). The protected segment (152) is a contiguous set of cache blocks which constitute a subset of the cache queue (142). In one or more embodiments of the invention, the protected segment (152) is adjacent to the probationary segment (154).

Continuing with FIG. 1B, in one or more embodiments of the invention, a cache block has completed a passage through the cache queue (142) upon entering the victim segment (170) of the cache queue (142). Thus, the cache block may travel through the entire cache queue (142) or just the probationary segment (154) of the cache queue in order to complete a passage. Specifically, the start of a passage through the cache block is at either the beginning of the protected segment (e.g., cache block 1 (156)), or the beginning of the probationary segment (e.g., cache block i+1(160)). As cache blocks are evicted from the cache queue (142) and/or recycled within the cache queue (142), any remaining cache blocks may iterate one or more spots in the cache queue (e.g., move to the right in the diagram shown in FIG. 1B). For example, if cache block j+k (164) is recycled to the start of the probationary segment (154) (i.e., to position i+1 (160)) and cache block j+k−1 (not shown) is evicted, then the remaining cache blocks in the probationary segment (154) each move to the right two spaces in the diagram in FIG. 1B. As another example, if cache block j+k (164) is recycled to the start of the protected segment (152) (i.e., to position 1 (156)) and cache block j+k−1 (not shown) is evicted, then the remaining cache blocks in the cache queue (142) each move to the right in the diagram in FIG. 1B. A passage through the cache queue is complete when the cache block enters the victim segment (170).

In one or more embodiments of the invention, a cache block is said to be "within" an Nth passage of the cache queue (142) for any positive integer N if the cache block has been recycled N−1 times. Thus, a cache block within a first passage of the cache queue (142) is any cache block which has never been recycled and a cache block within a third passage of the cache queue is a cache block which has been recycled 2 times.

Container Statistics

Referring back to FIG. 1A, in one or more embodiments of the invention, the cache manager (140) stores a set of container statistic objects (not shown). Each container statistic object stores data for a storage container in the storage device. In one or more embodiments of the invention, a container statistic object is created for each storage container corresponding to one or more cache blocks in the cache queue (142). The container statistic object may be created upon insertion of the first cache block for that storage container into the cache queue (142). In one or more embodiments of the invention, the container statistic object is removed when its corresponding storage container has no remaining cache blocks in the cache queue (142). Thus, the container statistic object may be removed when a last cache block for the storage container is evicted from the cache queue (142).

In one or more embodiments of the invention, the container statistic object includes a number of old cache blocks and a number of new cache blocks within the cache queue corresponding to the storage container. The number of old cache blocks for the storage container is a count of the storage blocks in the storage container which are stored as old cache blocks in the cache queue (142). The number of new cache blocks for the storage container is a count of the storage blocks in the storage container which are stored as new cache blocks in the cache queue (142). A storage block "stored" as a cache block refers to a storage block having a corresponding cache block within the cache queue (142). The cache block references a memory unit within the cache (100) storing a value (i.e., a dirty or non-dirty value) of the storage block.

Continuing with FIG. 1A, in one or more embodiments of the invention, upon startup of the cache, the cache manager (140) operates the cache queue similarly to a segmented least recently used (SLRU) cache queue (i.e., without probabilistic insertion and/or removal). Thus, in one or more embodiments of the invention, the cache manager (140) is configured to activate probabilistic insertion and/or probabilistic removal after a pre-defined warm-up period (defined as a number of warm-up transactions and/or a time period). In one or more embodiments of the invention, the cache manager (140) is configured to delay probabilistic insertion and/or probabilistic removal until the cache has gathered data for container statistic objects over a specified number of transactions (T). During and/or after this period, the cache manager (140) may gather one or more of the following container statistics for each container statistic object:

a. A number of first pass cache blocks ("num_first_pass_blocks"). First pass cache blocks are those that have completed a first passage through the probationary segment (i.e., those inserted at the beginning (i.e., top) of the probationary segment which were subsequently recycled to the beginning (i.e., top) of the probationary or protected segment) in one or more embodiments of the invention.

b. A number of first pass hits ("num_first_pass_hits"). This is a count of the total number of cache hits to those cache blocks which have completed a first passage through the probationary segment in one or more embodiments of the invention.

c. A number of second chance blocks ("num_second_chance_blocks"). This is a number of cache blocks that completed a first passage through the probationary segment without receiving a cache hit and were recycled to the beginning of the probationary segment in one or more embodiments of the invention.

d. A number of second pass hit blocks ("num_second_pass_hit_blocks"). This is a number of cache blocks that were hit during a second passage through the probationary segment in one or more embodiments of the invention.

e. An average number of cache accesses before receiving a first hit ("avg_cache_accesses_before_first_hit"). This is the average number of cache accesses between insertion of a cache block into the cache queue and receiving a cache hit in a second passage through the probationary segment in one or more embodiments of the invention.

f. An "active" status flag tracks whether probabilistic removal is activated for the corresponding storage container. The active status flag is initially set to FALSE.

g. A number of transactions since last access ("transactions_since_last_access"). This keeps track of the number of transactions that have executed (i.e., serviced by the cache) since a last access of the cache block (i.e., cache hit) in one or more embodiments of the invention. If this value exceeds a predefined threshold number, the cache blocks corresponding to this storage container are removed with a probability of 1 upon being considered for eviction from the cache. The predefined threshold number may be received from the graphical user interface of the cache manager (140) and/or from any authorized user or entity.

After the specified number of transactions (T) is complete, the cache manager (140) may continue collecting these container statistics. In one or more embodiments of the invention, the container statistic objects are updated once every T transactions based on said container statistics. Thus, the cache manager (140) may implement a counter to periodically update the container statistic objects such that every T transactions represent a data gathering cycle. In one or more embodiments of the invention, the container statistic objects are updated after every transaction. Thus, a moving window of transactions may be used to calculate the container statistics for each container statistic object The cache manager (140) may receive a warm-up time period and/or use the specified number of transactions to delay probabilistic insertion and/or removal in combination with any of the elements and/or steps of various embodiments of the invention.

Continuing with FIG. 1A, the cache manager (140) includes a graphical user interface (GUI) and/or an application programming interface (API) in accordance with one or more embodiments of the invention. The GUI and/or API includes functionality to receive a size of the moving window, the specified number of transactions, the warm-up time period, and/or any attribute or property used within the cache manager (140) from a user and/or software application. The GUI may be displayed, within a software application (e.g., a web application, desktop application, mobile application, etc.), to a user of the software application in order to receive input and provide feedback. The GUI may be used to provide customizations, report performance statistics, and/or modify system properties. The user of the GUI may be an end user of a computer system, a database administrator, a system administrator, a hardware designer, and/or any entity or person in accordance with one or more pre-issued security credentials. Alternatively or additionally, the cache manager (140) may be preconfigured or designed with a pre-specified size of the moving window, the specified number of transactions, the warm-up time period, and/or any attribute or property used within the cache manager (140).

In one or more embodiments of the invention, the cache manager (140) uses data gathered during the specified number of transactions to populate and/or modify container statistic objects. This may be done after every T transactions based on data gathered for the T transactions, after every transaction (based on a moving window of past transactions), and/or based on any sampling of past transaction data. In one or more embodiments of the invention, one or more of the following operations may be performed based on the gathered data:

a. For all container statistic objects having num_first_pass_hits>1, the estimated new block cost for the storage container ("estimated_new_block_cost") is computed as container latency*num_first_pass_hits/num_first_pass_blocks (following the formula $C_{0j}=E[N_j]*L_j$, where $E[N_j]$ is the expected number of cache hits to a new cache block from a storage container j during a first passage through the cache queue, discussed below). For such container statistic objects, the active status flag may be set to TRUE and num_first_pass_blocks and num_first_pass_hits may be set to zero.

b. Those container statistic objects not having num_first_pass_hits>1 continue using the old value of estimated_new_block_cost and keep incrementing num_first_pass_blocks and num_first_pass_hits until the next container statistic update.

c. For all container statistic objects having num_second_pass_hit_blocks>1, an estimated zero hit cache miss cost ("estimated_0hit_miss_cost") is computed as latency*(num_second_pass_hit_blocks/num_second_chance_blocks)/avg_cache_accesses_before_first_hit (following the formula $C_j=L_j R_j=L_j P(A|B_j)/T_j$, discussed below) in one or more embodiments of the invention. For these container statistic objects, num_second_chance_blocks, num_second_pass_hit_blocks, and avg_cache_accesses_before_first_hit may be reset to zero in one or more embodiments of the invention.

d. Those container statistic objects not having num_second_pass_hit_blocks>1 may continue using the existing estimated_0hit_miss_cost, and/or continue incrementing num_second_chance_blocks, num_second_pass_hit_blocks, and/or avg_cache_accesses_before_first_hit in one or more embodiments of the invention.

In one or more embodiments of the invention, after the warm-up period and/or specified number of transactions are executed, for the container statistic objects having an active status flag set to FALSE, the cache manager (140) inserts new cache blocks corresponding to the storage container with probability 1 at the beginning (i.e., top) of the probationary segment. Additionally, the cache manager (140) removes cache blocks corresponding to the storage container with probability 0.5 if they received zero cache hits during their first passage through the probationary segment (when considered for eviction from the cache). In one or more embodiments of the invention, this increases recycling of such cache blocks in order to improve accuracy of estimated container statistic data.

Analytical Cache Removal

Continuing with FIG. 1A, the cache manager (140) removes one or more new cache blocks from the victim segment of the cache queue (142) probabilistically in accordance with one or more embodiments of the invention. Thus, one or more new cache blocks in the victim segment may be assigned removal probabilities. A removal probability is the probability that a corresponding cache block will be evicted from the cache if the cache block is examined. For example, the removal probability may be a number between zero and one (inclusive). When a new cache block is considered for eviction from the cache queue, the cache manager (140) may randomly select a probability number. In one or more embodiments of the invention, the probability number is selected from a uniform distribution and/or over a range of potential values matching the range of potential values for the removal probability. Subsequently, the probability number is compared with the removal probability and a determination is made whether to evict the cache block or not. Continuing the above example, if the removal probability is greater than or equal to the probability number, the cache block is evicted from the cache queue (and the corresponding memory unit is freed).

In one or more embodiments of the invention, the cache manager (140) identifies a cache hit and/or cache miss in response to a requested cache operation. In one or more embodiments of the invention, the cache manager (140) tracks a number of cache hits received by a cache block (represented as $n_b$ for each cache block b) during each passage through the cache queue (142). A passage through the cache queue (142) may include a passage through any segment of the cache queue (e.g., probationary segment and/or protected segment) after which the cache block is evicted or recycled. In one or more embodiments of the invention, if $n_b$ equals zero for a cache block which is being considered for eviction, the cache block is removed from the cache queue. If $n_b>0$, then the cache block is recycled to the beginning (i.e., top) of the protected segment of the cache queue (142). $n_b$ may be initialized to any value upon insertion into the cache queue (142). In one or more embodiments of the invention, $n_b$ is reset to zero when cache blocks are recycled.

In one or more embodiments of the invention, the cache manager (140) sequentially considers cache blocks in the victim segment of the cache queue (142) for eviction starting at the end of the cache queue (142) whenever it is necessary to insert a new cache block into the cache queue (140) (e.g., when a cache miss occurs).

In one or more embodiments of the invention, the cache manager (140) calculates an estimated access rate for old cache blocks in the cache as $r_b=n_b/t_b$, where $t_b$ is the time elapsed since the old cache block b was inserted into the cache queue (142).

Continuing with FIG. 1A, in one or more embodiments of the invention, the cache manager (140) recycles a predefined fraction of new cache blocks with $n_b$ equal to zero to the beginning (i.e., top) of the probationary segment of the cache queue (142). The cache manager (140) may then observe, for each storage container, a fraction of those cache blocks which are hit during a second passage through the probationary segment. In one embodiment, the predefined fraction may be set and/or modified by any authorized user and/or entity connected to the cache manager (140). In one or more embodiments of the invention, the predefined fraction may be dynamically adjusted during operation of the cache in order to improve performance of the cache.

In one or more embodiments of the invention, the cache manager (140) calculates a conditional probability that a new cache block with $n_b=0$ after a first passage through the probationary segment will receive a cache hit during a second passage through the probationary segment as $P(A|B_j)=P(A \cap B_j)/P(B_j)$. In this formula, $B_j$ is the event of a new block belonging to storage container j not receiving a cache hit during its first passage through the probationary segment and A is the event that the new block receives a cache hit during a second passage through the probationary segment. This conditional probability may be estimated, for each storage container j, as a fraction of cache blocks that satisfy the event $B_j$ and receive a cache hit after being recycled to the beginning (i.e., top) of the probationary segment of the cache queue.

In one or more embodiments of the invention, the cache manager (140) calculates an estimated access rate for new cache blocks from a storage container j as $R_j=P(A|B_j)/T_j$, where $T_j$ is the average time spent in the cache by a new cache block from storage container j before receiving a cache hit during a second passage through the probationary segment. In one or more embodiments of the invention, any formula where $R_j$ is a decreasing function of $T_j$ may be used to calculate the estimated access rate (including any linear and/or exponential variations of the formula shown).

Continuing with FIG. 1A, in one or more embodiments of the invention, the cache manager (140) calculates an estimated cache miss cost for storage containers having one or more new cache blocks in the victim cache as $C_j=L_j*R_j$, where $L_j$ is the latency for the storage container j. The cache manager (140) may compute the probability $P_j$ of removing such a cache block so that for any two storage containers j and k with new cache blocks in the victim segment, the relative removal probabilities are inversely proportional to the relative cache miss costs: $P_j/P_k=C_k/C_j$. In one or more embodiments of the invention, any formula or variation of the given formula where the removal probability for a storage container is inversely related to its estimated cache miss cost may be used (including any linear and/or exponential variations of the formula shown). In one or more embodiments of the invention, the cache manager (140) may use this formula and/or a variation of this formula to isolate the removal probability ($P_j$) for any storage container have cache blocks in the cache queue. First, the cache manager (140) may identify a lowest estimated cache miss cost ($C_{j_{min}}$) among the storage containers having one or more new cache blocks in the victim segment. Then the cache manager (140) may calculate a scaling factor as $$P_{j_{min}} = 1 \bigg/ \left( C_{j_{min}} * \sum_{j \in V} 1/C_j \right).$$

Given that $$C_{min} = \min_{j \in V} C_j,$$

it follows that $P_j=P_{j_{min}}(C_{j_{min}}/C_j)$ where $j_{min}$ is the index of the lowest cost storage container (i.e., the storage container with the lowest estimated cache miss cost) among said storage containers. In one or more embodiments of the invention, the cache manager (140) uses this formula (or a variation thereof) to calculate a removal probability for new cache blocks in the cache queue (142). In one or more embodiments of the invention, any formula or variation of the given formula where the removal probability for a storage container is inversely related to its estimated cache miss cost may be used (including any linear and/or exponential variations of the formula shown).

Continuing with FIG. 1A, in one or more embodiments of the invention, the cache manager (140) sequentially considers all new cache blocks in the victim segment starting from the end of the cache queue, and if the considered cache block b has already made two passages through the probationary segment and has $n_b=0$, then it is chosen as the victim to be removed. In one or more embodiments of the invention, if a new cache block b from storage container j is making its first passage through the probationary segment, has $n_b=0$, and has an estimated cache miss cost $C_j$ smaller than that of the lowest cost old cache block in the victim segment, then it is chosen as the victim with probability $P_j$.

In one or more embodiments of the invention, if no new cache blocks are chosen as victims to be evicted after considering sequentially all new cache blocks in the victim segment, then the cache manager (140) chooses the first new cache block b from the end of the queue that has $n_b=0$ and whose estimated cache miss cost is smaller than the estimated cache miss cost of the lowest-cost old cache block in the victim segment. If the victim segment does not contain any new cache blocks, then the old cache block with the smallest estimated cache miss cost is chosen as the victim (i.e., evicted).

In one or more embodiments of the invention, the cache manager (140) "forgets" cache hits received by a cached block outside of a predefined number of past cache operations. In one or more embodiments of the invention, a forgotten cache hit is removed from consideration by the cache manager (140) for one or more container statistic objects. For example, in response to a cache hit being forgotten, a container statistic object may adjust the time elapsed since a cache block b was inserted into the cache queue ($t_b$) to start at the time of the earliest remembered cache hit. In one or more embodiments of the invention, the predefined number may be an integer multiple of the number of transactions used in calculating container statistics (T, discussed above).

In one or more embodiments of the invention, when considering a cache block b for eviction, the cache manager (140) evicts the cache block b if the storage container of the cache block b (i.e., the storage container of a storage block corresponding to cache block b) has not been accessed within a predefined number of transactions. In one or more embodiments of the invention, the predefined number may be an integer multiple of the number of transactions used in calculating container statistics (T, discussed above).

Workload Changes

Continuing with FIG. 1A, in one or more embodiments of the invention, the cache manager (140) is configured to detect that a workload change has occurred for a storage container. In one or more embodiments of the invention, the cache manager (140) is configured to detect that a workload change has occurred for a storage container j when any two infrequently accessed storage blocks within storage container j receive a predefined number of accesses (N) within a predefined time period (e.g., 20 seconds). In one or more embodiments of the invention, an infrequently accessed storage block is a storage block having an access rate (i.e., estimated access rate) which is below a predefined access rate threshold. In one or more embodiments of the invention, the cache manager (140) includes functionality to calculate an estimated access rate in accordance with one or more of the processes disclosed herein (e.g., the process of FIG. 2, discussed below).

In one or more embodiments of the invention, the cache manager (140) detects that a workload change has occurred for the storage container j if the access rate of the container j computed over at least the predefined number of accesses (N) increases by a predefined change threshold (e.g., a percentage increase, a multiple increase, a number of accesses per unit time increase, etc.). In one or more embodiments of the invention, the cache manager (140) is configured to receive the predefined number of accesses (N), the predefined time period, the predefined access rate threshold, and/or the predefined change threshold from a user of a GUI of the cache manager (140). Examples of a user of the GUI may include but are not limited to an end user of a computer system, a database administrator, a system administrator, a hardware designer, and/or any entity or person in accordance with one or more pre-issued security credentials. Alternatively or additionally, the cache manager (140) may be preconfigured or designed with a predefined number of accesses (N), a predefined time period, a predefined access rate threshold, a predefined change threshold, and/or any attribute or property used within the cache manager (140).

In one or more embodiments of the invention, the cache manager (140) includes functionality to set a workload change time attribute ("workload_change_time") of a container statistic object corresponding to a storage container. The workload_change_time attribute may be initialized to zero. In one or more embodiments of the invention, the cache manager (140) is configured to update the workload_change_time attribute to store the time when a workload change is detected.

In one or more embodiments of the invention, the cache manager (140) is configured to select a "stale" cache block as a potential victim for removal from the cache queue (142). In one or more embodiments of the invention, a stale cache block is any old cache block which has not been accessed for a predefined number of cache operations and whose latest access time is prior to the workload_change_time of its corresponding storage container.

Analytical Cache Insertion

Continuing with FIG. 1A, in one or more embodiments of the invention, the cache manager (140) is configured to calculate, for each storage container j among a set of storage containers (Z), an expected number of cache hits ($E[N_j]$) to a new cache block b corresponding to the storage container j. The set of containers may include storage containers having one or more cache blocks in the cache queue (142), storage containers having a container statistic object, storage containers having one or more old and/or new cache blocks in one or more segments (i.e., probationary segment, protected segment, victim segment) of the cache queue, and/or any subset of storage containers in the storage device (110). In one or more embodiments of the invention, the cache manager (140) estimates the expected number of cache hits ($E[N_j]$) as an average number of cache hits received by new cache blocks from container j during a first passage through the probationary segment of the cache queue (142). The average number of cache hits may be calculated for any predefined number of past cache blocks in accordance with various embodiments of the invention. For example, the cache manager (140) may track the number of cache hits (during a first passage) for the last 10 new cache blocks from a storage container j. The cache manager (140) may then take an average of the number of cache hits for the 10 new cache blocks to be used as an estimate of the expected number of cache hits for one or more new cache blocks from storage container j.

In one or more embodiments of the invention, the cache manager (140) is configured to calculate an estimated a priori cache miss cost (i.e., estimated cache miss cost) for each storage container j of the set of storage containers (Z) as $C_j^0 = L_j * E[N_j]$, where $L_j$ is a latency value for the storage container j. In one or more embodiments of the invention, the estimated a priori cache miss cost represents a miss cost value used for probabilistic insertion. Thus, in one or more embodiments of the invention, the estimated a priori cache miss cost may relate only probabilistically to the actual cache miss cost of a new block.

Continuing with FIG. 1A, in one or more embodiments of the invention, the cache manager (140) is configured to identify a maximum estimated a priori cache miss cost ($C_{max}^0$) among the calculated estimated a priori cache miss costs. In various embodiments of the invention, the cache manager (140) may calculate one or more of the estimated a priori cache miss costs before each insertion into the cache queue (142), periodically based on a specified number of cache operations or transactions, and/or in advance of detecting a cache miss.

In one or more embodiments of the invention, the cache manager (140) is configured to identify a storage block associated with a cache miss. The storage block may be a storage block referenced by a cache operation. For example, the identified storage block may be referenced by a cache read or a cache write. In one or more embodiments of the invention, the identified storage block does not exist in the cache (100) or the associated cache queue (142). Thus, the storage block may be accessed in order to obtain a value required by the cache operation or to write a value to the storage block. In one or more embodiments of the invention, the cache manager (140) identifies a storage container including the storage block within the storage device (110).

In one or more embodiments of the invention, the cache manager (140) is configured to calculate an arrival rate ($\lambda_j$) of new blocks for each storage container among the set of storage containers (Z). In one or more embodiments of the invention, the arrival rate may be a number of new cache blocks from the storage container arriving in the cache queue (142) per cache operation, type of cache operation, unit time (e.g., millisecond), and/or any other predefined cache metric of decreasing arrival for new cache blocks.

Continuing with FIG. 1A, in one or more embodiments of the invention, the cache manager (140) is configured to identify a maximum arrival rate among the calculated arrival rates for the set of storage containers. In one or more embodiments of the invention, the maximum arrival rate and the maximum estimated a priori cache miss cost may or may not correspond to different storage containers. Thus, the maximum arrival rate may correspond to the storage container having the most new cache blocks inserted into the cache queue (142) in accordance with the predefined cache metric.

In one or more embodiments of the invention, for a storage block b corresponding to a cache miss, the cache manager (140) is configured to determine whether the storage container j of the storage block b has an arrival rate which is greater than the arrival rate of the container having the maximum estimated a priori cache miss cost. If so, in one or more embodiments of the invention, the cache manager (140) calculates an insertion probability ($P_j$) for the storage block as a function of the maximum arrival rate. In one or more embodiments of the invention, the cache manager (140) calculates the insertion probability ($P_j$) as $$P_j = \frac{C_j^0}{C_{max}^0} * \frac{\lambda_{jmax}}{\lambda_j}.$$

In one or more embodiments of the invention, if the storage container j of the storage block b has an arrival rate which is less than or equal to the arrival rate of the container having the maximum estimated cache miss cost, the cache manager (140) calculates the insertion probability as a function of the estimated cache miss cost of the container j. In one or more embodiments of the invention, when the storage block b has an arrival rate which is less than or equal to the arrival rate of the container having the maximum estimated cache miss cost, the cache manager (140) calculates the insertion probability as $$P_j = \frac{C_j^0}{C_{max}^0}.$$

In one or more embodiments of the invention, after calculating the insertion probability, the cache manager (140) inserts a new cache block corresponding to storage block b into the cache queue (142) with probability $P_j$.

In one or more embodiments of the invention, the cache manager (140) includes functionality to probabilistically insert one or more cache blocks into the cache queue (142). In one or more embodiments of the invention, the cache manager (140) is configured to randomly select a probability number. The probability number may be selected from a uniform distribution and/or over a range of potential values matching the range of potential values for the insertion probability. In one or more embodiments of the invention the cache manager (140) is configured to insert the new cache block into the cache queue (142) (and to insert the value of a storage block into a corresponding memory unit in the cache) if the insertion probability is greater than or equal to the probability number. In one or more embodiments of the invention, if the insertion probability is less than the probability number, the new cache block is not inserted into the cache queue (142). Any method of random number generation, including pseudo random number generation, may be used.

Shadow Lists

FIG. 8A shows an old block shadow list (849) in accordance with one embodiment of the invention. As shown in FIG. 8A, the old block shadow list (849) has multiple components including a set of old cache block entries (e.g., old cache block entry A (800), old cache block entry B (802), old cache block entry C (804), old cache block entry J (806), old cache block entry J+1 (808), old cache block entry J+2 (810)) corresponding to old cache blocks evicted from a cache queue. The components of the old block shadow list (849) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., the Internet), with wired and/or wireless segments. Those skilled in the art will appreciate that there may be more than one of each separate component running on a device, as well as any combination of these components within a given embodiment of the invention.

In one or more embodiments of the invention, the old block shadow list (849) stores a set of old cache blocks entries (e.g., old cache block entry A (800), old cache block entry B (802), old cache block entry C (804), old cache block entry J (806), old cache block entry J+1 (808), old cache block entry J+2 (810)) evicted from a cache queue. In one or more embodiments of the invention, for each old cache block evicted from the cache queue, its corresponding memory unit is freed.

FIG. 8B shows a new block shadow list (899) in accordance with one embodiment of the invention. As shown in FIG. 8B, the new block shadow list (899) has multiple components including a set of new cache block entries (e.g., new cache block entry A (850), new cache block entry B (852), new cache block entry C (854), new cache block entry J (856), new cache block entry J+1 (858), new cache block entry J+2 (860)). The components of the new block shadow list (899) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the new block shadow list (899) stores a set of new cache block entries (e.g., new cache block entry A (850), new cache block entry B (852), new cache block entry C (854), new cache block entry J (856), new cache block entry J+1 (858), new cache block entry J+2 (860)) corresponding to new cache blocks evicted from a cache queue. In one or more embodiments of the invention, an entry is not inserted into the new block shadow list (899) for new cache blocks which are evicted after making two or more passages through the probationary segment. In one or more embodiments of the invention, for each new cache block evicted from the cache queue, its corresponding memory unit is freed.

Referring to FIGS. 8A and 8B, a shadow list (e.g., old block shadow list (849) and/or new block shadow list (899)) may be a virtual structure (e.g., a data structure in memory), a physical structure implemented on a storage device (e.g., a static random access memory device), and/or any combination thereof. The shadow list may be fixed in size or variable (i.e., able to change its size in order to accommodate more or less cache blocks). In one or more embodiments of the invention, the shadow list is dynamically resized in order to adjust for performance changes and/or in response to a request from a cache manager (e.g., cache manager (140) of FIG. 1A, discussed above).

In one or more embodiments of the invention, each entry (i.e., cache block entry) in a shadow list includes a storage block index, a storage container index, a number of total accesses to the evicted cache block, and a time of the first access for the evicted cache block. The storage block index may reference the location of the storage block in a storage container and/or a corresponding memory unit in the cache. The storage container index references the location of a corresponding storage container on a storage device. In one or more embodiments of the invention, the number of total accesses to the evicted cache block and the time of the first access to the evicted cache block are stored within or copied from a container statistic object for the storage container corresponding to the evicted cache block. The number of total accesses to the evicted cache block may be maintained from the time the cache block is initially inserted into the cache queue. In one or more embodiments of the invention, the number of total accesses for the evicted cache block includes a first access occurring prior to the evicted cache block's initial insertion into the cache queue (i.e., causing the cache miss and subsequent insertion). In one or more embodiments of the invention, the time of the first access to the evicted cache block is a time of the initial access which caused a cache miss and initiated insertion of the cache block into the cache queue. Any other information related to the evicted cache block, the evicted cache block's container statistic object, and/or the evicted cache block's corresponding storage block may be stored within a cache block entry in the shadow list, in accordance with various embodiments of the invention. This information may be maintained for the cache block even after eviction from the cache queue and insertion of a corresponding entry into a shadow list (i.e., the old block shadow list (849) and/or the new block shadow list (899)).

Returning to FIG. 1A, in one or more embodiments of the invention, the cache manager (140) stores, for each of a predefined number (T) of old cache blocks evicted from the cache queue (142), an estimated cache miss cost within a set of estimated cache miss costs. This estimated cache miss cost may be calculated in accordance with one or more of the methods for calculating an estimated cache miss cost as disclosed herein (e.g., the process of FIG. 2, discussed below).

In one or more embodiments of the invention, the cache manager (140) identifies a maximum estimated old cache miss cost ($C_{SOldMax}$) of the set of estimated old cache miss costs. In one or more embodiments of the invention, the cache manager (140) calculates a standard deviation ($\sigma$) of the estimated old cache miss costs. The standard deviation may be a square root of a variance of the set of estimated old cache miss costs. In one or more embodiments of the invention, the cache manager (140) calculates an estimated cache miss cost threshold ($C_T$) for inserting cache blocks into the cache queue (142) for storage blocks having entries in a shadow list. In one or more embodiments of the invention, the estimated cache miss cost threshold ($C_T$) may be calculated using any formula of the maximum estimated old cache miss cost ($C_{SOldMax}$) and/or the standard deviation. In one or more embodiments of the invention, the estimated cache miss cost threshold is calculated as $C_T = C_{SOldMax} + \sigma$.

Continuing with FIG. 1A, in one or more embodiments of the invention, the cache manager (140) detects a cache miss for a storage block b which has a corresponding entry in a shadow list. In one or more embodiments of the invention, the storage block b has received at least 2 accesses (i.e., initial insertion of a corresponding cache block into the cache queue (142) and the second access received while in the shadow list).

In one or more embodiments of the invention, the cache manager (140), in response to the cache miss, calculates an estimated cache miss cost ($C_b$) for the storage block b using the same method used to calculate estimated cache miss costs for old cache blocks in the cache queue (142).

In one or more embodiments of the invention, the management module (144) provides interoperability, format conversion and/or cross-compatibility among the various components of the system (199), as illustrated in an exemplary form in FIG. 1A. For example, the management module (144) may transfer data between the cache manager (140) and the storage device (110), and/or vice-versa. Furthermore, the management module (144) may be used as a seamless integration point between any combination of components both within the system (199) and outside of the system.

In one or more embodiments of the invention, various components of the system (199) are optional and/or may reside within other components or may be located on one or more physical devices. In one or more embodiments of the invention, the cache manager (140) and the management module (144) reside within a software application (e.g., an operating system kernel) and/or a memory management unit. Various other arrangements and combinations may also exist.

Figure 2:
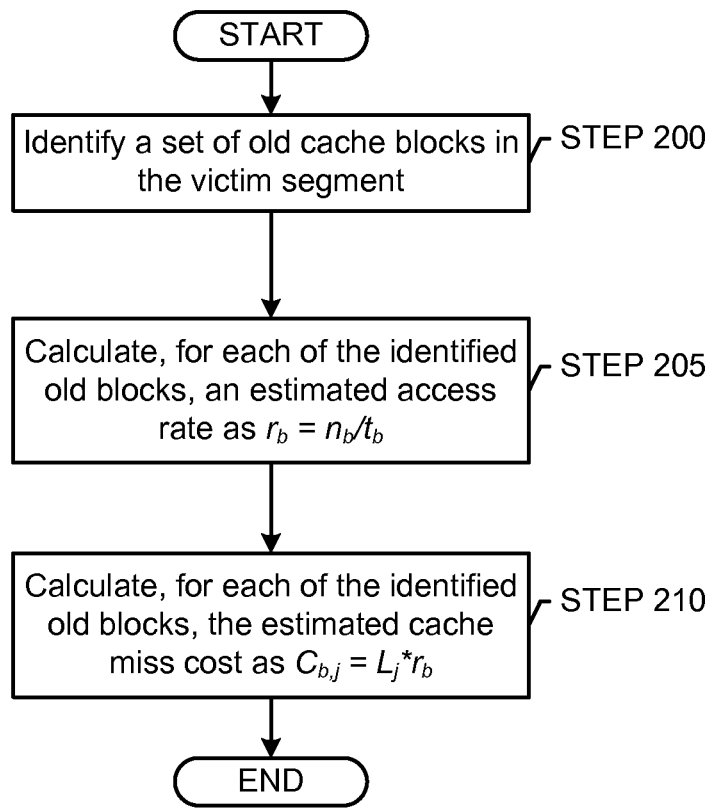
FIGS. 2, 3, 4A, 4B, 6, 7, 9, and 10 depict flowcharts in accordance with one or more embodiments of the invention.

FIG. 2 shows a flowchart in accordance with one or more embodiments of the invention. The steps of the flowchart shown in FIG. 2 may be used to calculate an estimated cache miss cost for a cache block. Those skilled in the art, having the benefit of this detailed description, will appreciate the order and number of steps shown in FIG. 2 may differ among embodiments of the invention. Further, one or more steps in FIG. 2 may be optional and/or may be performed in any combination of different orders.

In STEP 200, a set of old cache blocks is identified within a victim segment (e.g., victim segment 170 of FIG. 1B, discussed above) of a cache queue (e.g., cache queue 150 of FIG. 1B, discussed above). The set of old cache blocks may include all cache blocks in the victim segment which have been accessed at least once since being inserted into the cache queue.

In STEP 205, an estimated access rate is calculated for each of the identified old cache blocks in the victim segment. In one or more embodiments of the invention, the estimated access rate for a cache block b within the set is calculated as $r_b = n_b/t_b$, where $n_b$ is a number of hits received during a current passage through the cache queue and $t_b$ is the time elapsed since the old cache block b was inserted into the cache queue.

In STEP 210, an estimated cache miss cost is calculated for each of the identified old cache blocks in the victim segment. In one or more embodiments of the invention, the estimated cache miss cost is calculated as $C_{b,j} = L_j * r_b$, where $L_j$ is a latency (time) for the storage container j of the old cache block and $r_b$ is the estimated access rate for the cache block b. In one or more embodiments of the invention, $r_b$ may be the estimated access rate calculated in STEP 205 or any estimated access rate calculated for the cache block b based on any method of detecting and/or estimating access rates as disclosed herein.

In one or more embodiments of the invention, STEPS 200, 205, and 210 may be performed for a single old cache block (rather than all old cache blocks in the victim segment) or may be performed iteratively (sequentially from the end of the cache queue) for each old cache block within the victim segment. Any one of these steps may also be performed in response to a cache miss, asynchronously in anticipation of a cache miss, periodically in conjunction with one or more data gathering processes, and/or in conjunction with any cache operation.

Figure 3:
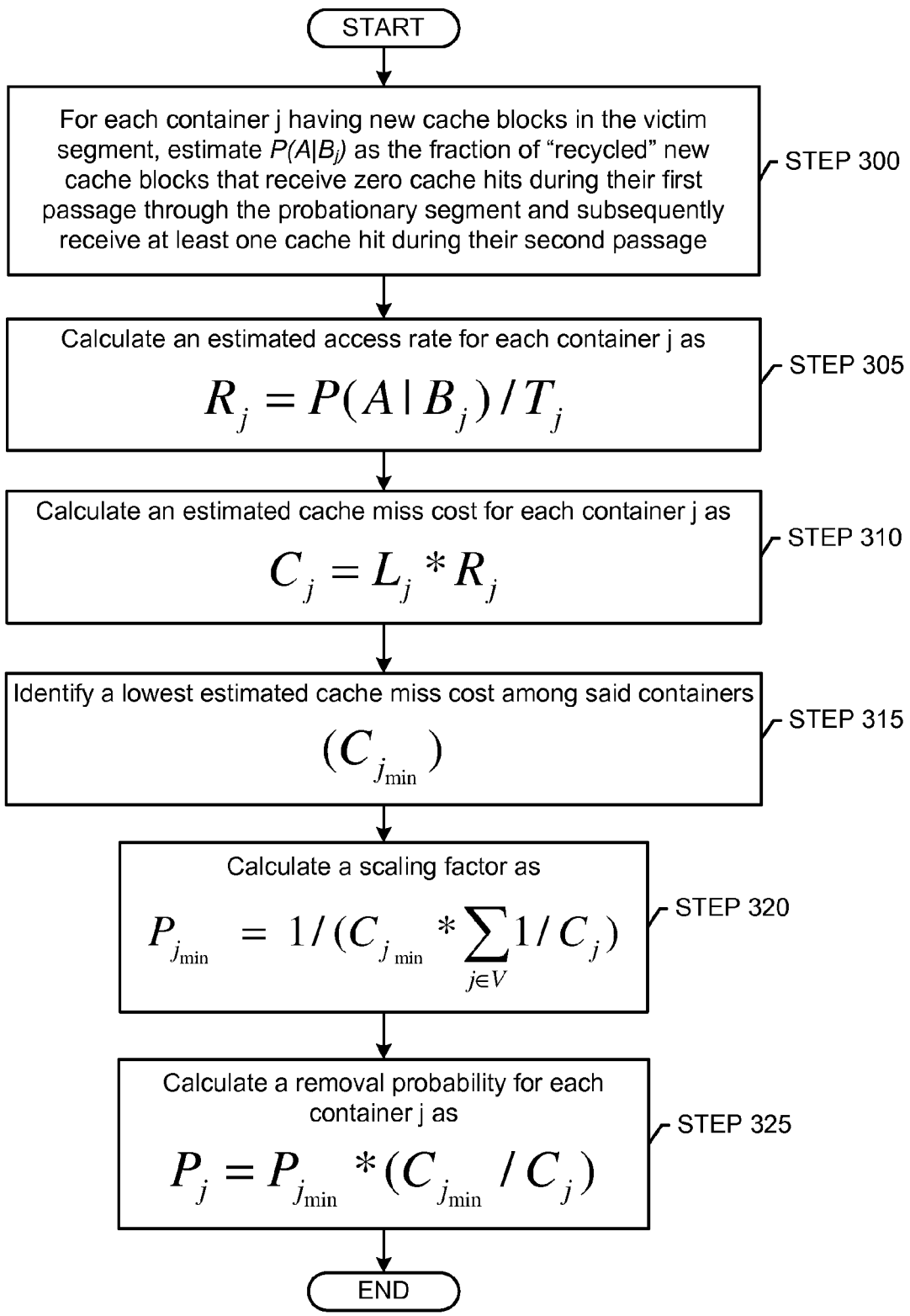

FIG. 3 shows a flowchart in accordance with one or more embodiments of the invention. The steps of the flowchart shown in FIG. 3 may be used to calculate a removal probability for a cache block. Those skilled in the art, having the benefit of this detailed description, will appreciate the order and number of steps shown in FIG. 3 may differ among embodiments of the invention. Further, one or more steps in FIG. 3 may be optional and/or may be performed in any combination of different orders.

In STEP 300, given that a new cache block b has received zero cache hits during a first passage through the probationary segment, a probability that a new cache block from a storage container j will subsequently receive at least one cache hit during its second passage through the probationary segment ($P(A|B_j)$) is approximated. In one or more embodiments of the invention, this probability is calculated for each storage container j having at least one new cache block in the victim segment of the cache queue and is equal for all new cache blocks of the storage container j in the victim segment. In one or more embodiments of the invention, this probability is estimated for the storage container j as the fraction of recycled new cache blocks (with zero cache hits) from the storage container j that subsequently receive at least one cache hit during their second passage through the probationary segment.

In STEP 305, an estimated access rate is calculated for the storage container j. In one or more embodiments of the invention, the estimated access rate is calculated as $R_j = P(A|B_j)/T_j$, where $T_j$ is the average time spent in the cache by a new cache block from storage container j before receiving a cache hit during a second passage through the probationary segment. In one or more embodiments of the invention, $P(A|B_j)$ may be an output of STEP 300 or any cache hit probability calculated for the storage container j based on any method of calculating a cache hit probability. Any variation of the given formula where estimated access rate is inversely related to a time spent in the cache by the cache block may be used (including any linear and/or exponential variations of the formula shown) to calculate an estimated access rate.

In STEP 310, an estimated cache miss cost is calculated for the storage container j as $C_j=L_j*R_j$, where Lj is a latency of the storage container. In one or more embodiments of the invention, $R_j$ may be the estimated access rate calculated in STEP 305 or any estimated access rate calculated for the storage container j based on any method of detecting and/or estimating access rates. Any variation of the given formula where estimated access rate is related to a latency of the storage container and/or storage device may be used (including any linear and/or exponential variations of the formula shown) to calculate an estimated cache miss cost.

In STEP 315, a lowest estimated cache miss cost ($C_{j_{min}}$) identified among all storage containers having at least one new cache block in the victim segment. This may be done by tracking each new addition into the victim segment and keeping a reference to the lowest estimated cache miss cost, iterating the estimated cache miss costs for all cache blocks in the victim segment at one or more predefined times (e.g., when considering a cache block for eviction, before/after considering a cache block for eviction, etc.), and/or tracking the lowest estimated cache miss cost when a modification occurs to the victim segment.

In STEP 320, a scaling factor is calculated as $$P_{j_{min}} = 1 \Big/ \Big( C_{j_{min}} * \sum_{j \in V} 1/C_j \Big).$$

The scaling factor may be any constant estimated or calculated using a formula relating an estimated cache miss cost and/or removal probability of a storage container j to the estimated cache miss cost and/or probability of the storage container $j_{min}$ having the lowest estimated cache miss cost.

In STEP 325, a removal probability is calculated for each storage container j. In one or more embodiments of the invention, the removal probability is calculated for any storage container j with new cache blocks in the victim segment as $P_j=P_{j_{min}}*(C_{j_{min}}/C_j)$. In one or more embodiments of the invention, any variation of the given formula where the removal probability of a storage container j is related to removal probability of the lowest cost storage container (i.e., the storage container having a new cache block in the victim segment with the lowest estimated cache miss cost) may be used (including any linear and/or exponential variations of the formula shown) to calculate the removal probability.

Figure 4A:
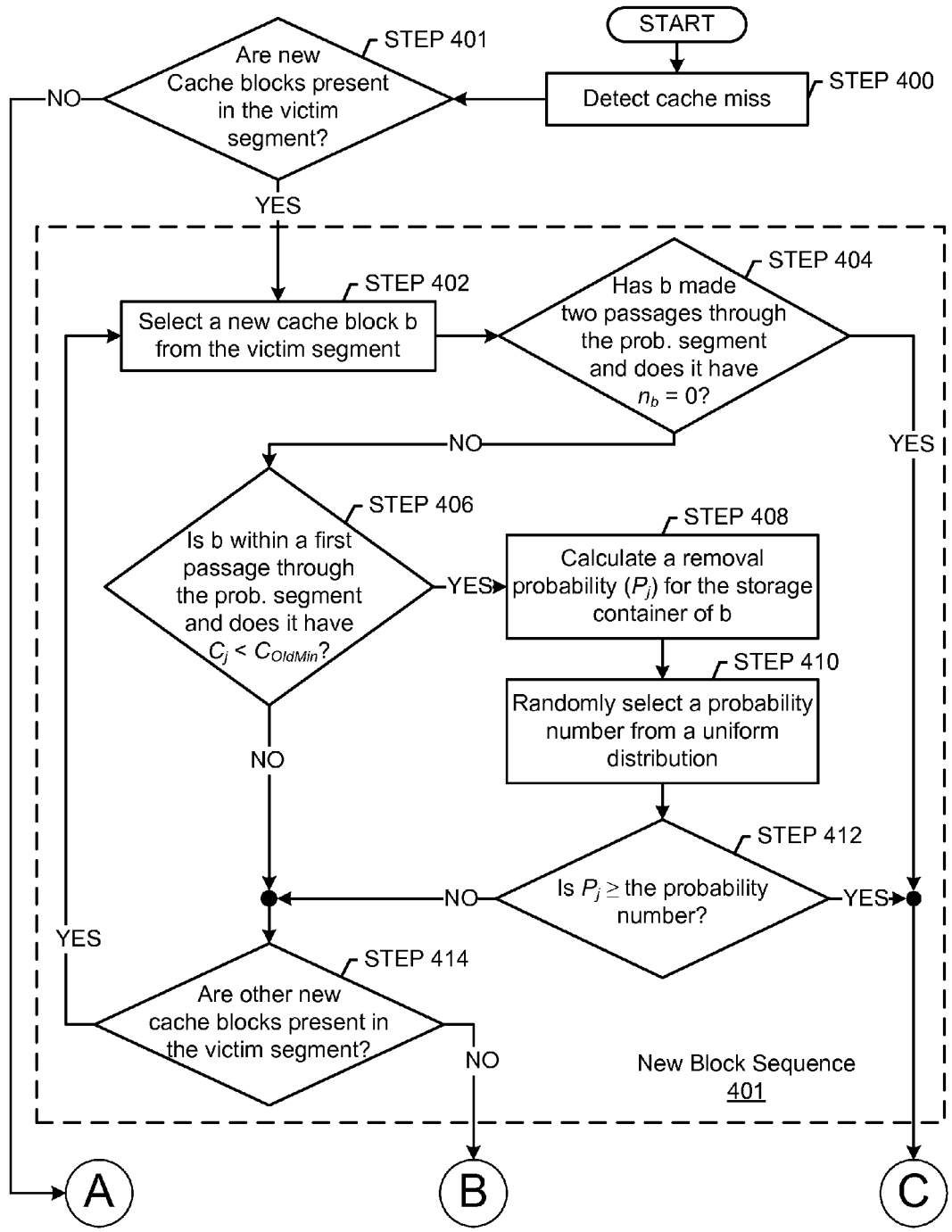
Figure 4B:
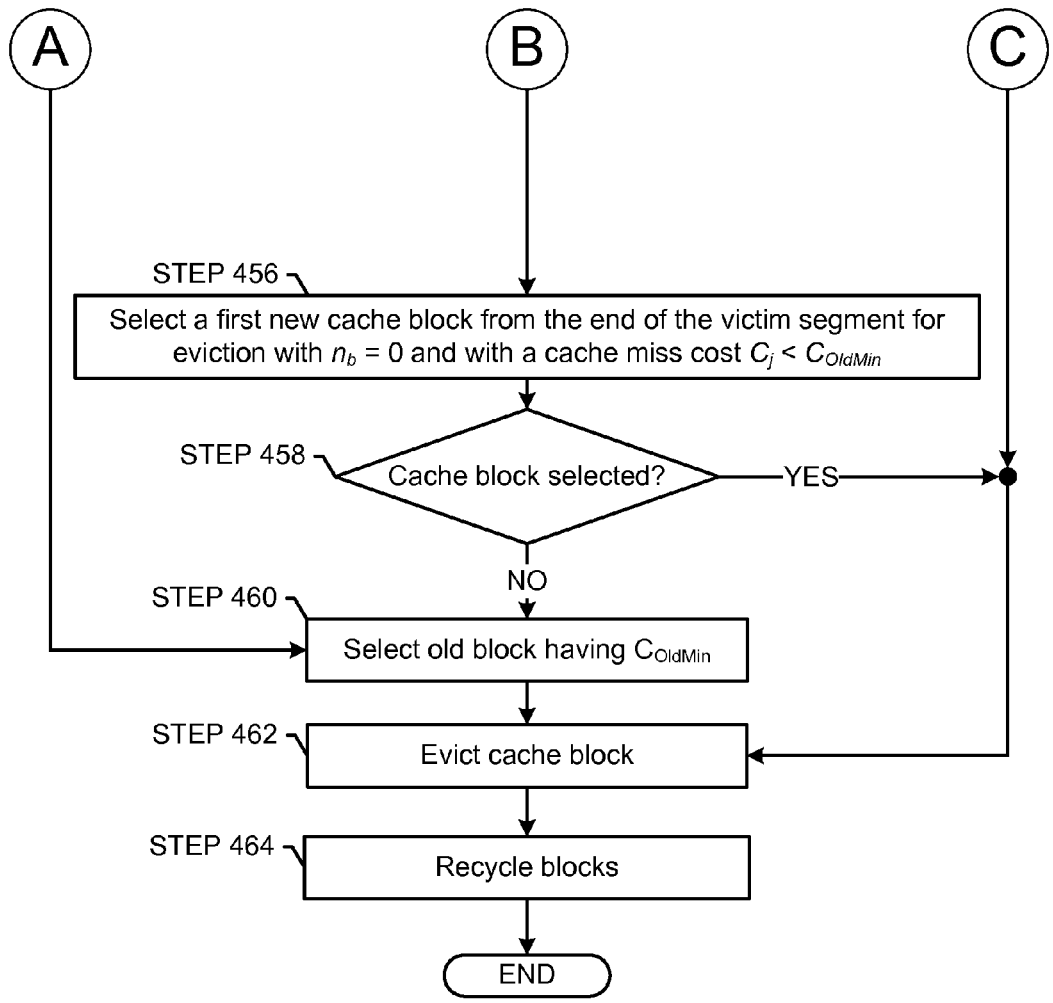

FIGS. 4A and 4B show flowcharts in accordance with one or more embodiments of the invention. The steps of the flowcharts shown in FIGS. 4A and 4B may be used to select a cache block for eviction from a cache queue. Those skilled in the art, having the benefit of this detailed description, will appreciate the order and number of steps shown in FIGS. 4A and 4B may differ among embodiments of the invention. Further, one or more steps in FIGS. 4A and 4B may be optional and/or may be performed in any combination of different orders. Additionally, one or more steps may be actively or passively performed. For example, determination steps may be based on testing a condition, receiving an interrupt showing that the condition exists, omitted, and/or performed in any other manner.

In STEP 400, a cache miss is detected. This may be due to a read request or a write request for a non-cached storage block on a storage device. In one or more embodiments of the invention, this may cause an access to the storage device. In accordance with various embodiments of the invention, the storage block may then be selected for insertion into the cache (i.e., a copy of a value of the storage block may be placed into a memory unit corresponding to the storage block). In one or more embodiments of the invention, the cache miss may be detected by a cache manager (e.g., cache manager (140) of FIG. 1, discussed above) operatively connected to the cache.

In STEP 401, it is determined whether at least one new cache block is present within a victim segment of a cache queue. If at least one new cache block is present within the victim segment, the process proceeds to STEP 402. If not, the process proceeds to STEP 460 of FIG. 4B. Determining whether at least one new cache block is present within the victim segment may require iteration of the victim segment and/or a check of one or more data structures (e.g., within a cache manager) storing a count and/or flag corresponding to new cache blocks in the cache queue.

In STEP 402, a new cache block b is selected for consideration. In one or more embodiments of the invention, cache block b is a first new cache block from the end of the victim segment (considered sequentially).

In STEP 404, it is determined whether cache block b has made at least two passages through the probationary segment of the cache queue and whether the number of cache hits for cache block b for the current passage through the cache queue is zero. If both conditions are met (i.e., true), cache block b is selected for eviction and the process proceeds to STEP 462 of FIG. 4B. If either condition is not met, the process proceeds to STEP 406. In one or more embodiments of the invention, b must have a number of completed passages equal to some predefined number as obtained from a programmer of a cache manager (e.g., cache manager (140) of FIG. 1, discussed above) and/or other entity.

In STEP 406, it is determined whether cache block b is within a first passage through the probationary segment of the cache queue and has an estimated cache miss cost ($C_j$) which is less than the lowest estimated cache miss cost among old cache blocks in the victim segment ($C_{OldMin}$). If both conditions are met, the process proceeds to STEP 408. If not, the process proceeds to STEP 414. In various other embodiments of the invention, STEP 406 may require determining whether cache block b has completed any predefined number of passages through the cache queue (rather than a first passage).

In one or more embodiments of the invention, while searching for the lowest estimated cache miss cost among old cache blocks in the victim segment, if a stale cache block is encountered, it is selected as a potential victim. Subsequently, all new cache blocks (if any) between cache block b and the end of the victim segment may be sequentially considered for eviction in accordance with one or more of the processes of evicting new cache blocks as described herein. In one or more embodiments of the invention, if none of the new cache blocks are selected for eviction, the stale cache block is evicted from the cache queue.

In one or more embodiments of the invention, since no cache block movement may occur after a cache hit, a potential victim is selected for removal in anticipation of a future cache miss. In one or more embodiments of the invention, a designated thread is used to asynchronously identify the potential victim. In one or more embodiments of the invention, after a cache block is evicted, all cache blocks after (i.e., below) the evicted cache block are recycled, either to the beginning (i.e., top) of the protected segment if they have $n_b>0$ or to the beginning of the probationary segment if they have $n_b=0$.

In STEP 408, a removal probability ($P_j$) is calculated for the storage container of cache block b. In one or more embodiments of the invention, the storage container of cache block b is a storage container on a storage device corresponding to the cache which includes a storage block referenced by a memory unit in the cache. The memory unit is referenced by the cache block in the cache queue and may include a clean value (i.e., matching the value of the storage block) and/or dirty value (i.e., different from the value of the storage block). In one or more embodiments of the invention, the removal probability of cache block b is calculated as a decreasing function of the estimated cache miss cost for the storage container of cache block b. In one or more embodiments of the invention, the process described by the flowchart depicted by FIG. 3 is used to calculate the removal probability of cache block b. In one or more embodiments of the invention, the removal probability is calculated as $P_j = P_{j_{min}} *(C_{j_{min}}/C_j)$, where $P_{j_{min}}$ is a scaling factor calculated as $$P_{j_{min}} = 1 \Big/ \left( C_{j_{min}} * \sum_{j \in V} 1/C_j \right)$$

and where $C_{j_{min}}$ is a lowest estimated cache miss cost among new cache blocks in the victim segment.

In STEP 410, a probability number is randomly selected from a uniform distribution. In one or more embodiments of the invention, the range of the uniform distribution is the same as the range of the removal probability calculated in STEP 408. The probability number may be obtained from any number of sufficiently random processes which produce a random distribution (within a given tolerance). Any method of random number generation may be used. For purposes of this disclosure, random selection may refer to any method which is capable of producing a range of possible outcomes suitable for usage in probabilistic analysis. Random number generation and random number as used herein may include pseudo random number generation and pseudo random number, respectively, without departing from the scope of the invention.

In STEP 412, it is determined whether the removal probability ($P_j$) is greater than or equal to the probability number. If the removal probability is greater than or equal to the probability number, the process proceeds to STEP 462 of FIG. 4B. If not, the process proceeds to STEP 414. For example, if given a possible range of 0 to 100 for both numbers, if the removal probability is 45 and the probability number is 40, the process proceeds to STEP 462 of FIG. 4B. In one or more embodiments of the invention, STEPS 408, 410, and 412 may use any method of comparing the removal probability to a random number selected from a uniform distribution. Thus, in one or more embodiments of the invention, cache block b is more likely to be removed if it has a higher removal probability.

In STEP 414, it is determined whether any unconsidered new cache blocks remain in the victim segment. In one or more embodiments of the invention, the unconsidered new cache block must be a new cache block which is (1) positionally farther from the end of the cache queue than cache block b, and (2) has not been considered for eviction during the new block sequence of FIG. 4A (401). If such a cache block exists, the process proceeds to select this cache block in a return to STEP 402. If not, the process proceeds to STEP 456 of FIG. 4B.

Referring now to FIG. 4B, the steps of the flowchart represent a continuation of the flowchart depicted by FIG. 4A. Connection points (i.e., A, B, and C) between the figures depict a continuation of the process described.

In STEP 456, a first new cache block conforming to a set of selection criterion is selected for eviction from the cache queue in one or more embodiments of the invention. In one or more embodiments of the invention, the selection criterion are that the new cache block must have $n_b=0$ and an estimated cache miss cost $C_j < C_{OldMin}$, where $n_b$ is a number of cache hits received during a current passage through the cache queue, $C_j$ is an estimated cache miss cost of the storage container of the new cache block, and $C_{OldMin}$ is a lowest estimated cache miss cost among old cache blocks in the victim segment. In one or more embodiments of the invention, new cache blocks are considered sequentially from the end of the victim segment. It is possible that no new cache block will be selected by this step if none of the cache blocks in the victim segment meet the stated criterion. In one or more embodiments of the invention, the selected first new cache block is identified by the new block sequence of FIG. 4A (401). Thus, it may not be necessary to iterate through the new cache blocks in the victim segment again if the iteration has already been performed by such a process in one or more embodiments of the invention. In this case, the previous process may maintain a reference to the first new cache block in the victim segment meeting the criteria described in this step.

In STEP 458, it is determined whether a cache block was selected by STEP 456. If so, the process proceeds to STEP 462. If not, the process proceeds to STEP 460.

In STEP 460, an old cache block having a lowest estimated cache miss cost ($C_{OldMin}$) among old cache blocks in the victim segment is selected for eviction in one or more embodiments of the invention. The estimated cache miss cost ($C_{OldMin}$) may be calculated by any means of estimating a miss cost of a cache block. In one or more embodiments of the invention, the steps of the process described by FIG. 2 are used to calculate estimated cache miss costs (including $C_{OldMin}$) for old cache blocks in the victim segment.

In STEP 462, the selected cache block from the victim segment is evicted from the cache queue in one or more embodiments of the invention. Thus, the corresponding memory unit within the cache is freed. In one or more embodiments of the invention, eviction of a cache block may trigger a dirty value from the memory unit to be written back to its corresponding storage block on the storage device. In one or more embodiments of the invention, a new storage block is cached into the freed memory unit and a corresponding new cache block is entered into the cache at the beginning (i.e., top) of the probationary segment. In order to enter the new cache block to the beginning of the probationary segment, in one or more embodiments of the invention, all cache blocks before the location of the evicted cache block (i.e., closer to the beginning of the cache queue) are moved towards the end of the cache queue in order to fill the gap left by the evicted cache block.

In STEP 464, one or more cache blocks in the cache queue are recycled. Recycling may refer to a backward movement of a cache block in the cache queue. In one or more embodiments of the invention, all cache blocks after a position of the evicted cache block (i.e., closer to the end of the cache queue) are recycled, either to the beginning of the protected segment if they have $n_b > 0$ (i.e., have received at least one cache hit during a current passage through the cache queue) or to the beginning of the probationary segment if they have $n_b = 0$ (i.e., have received zero cache hits during a current passage through the cache queue).

Figure 6:
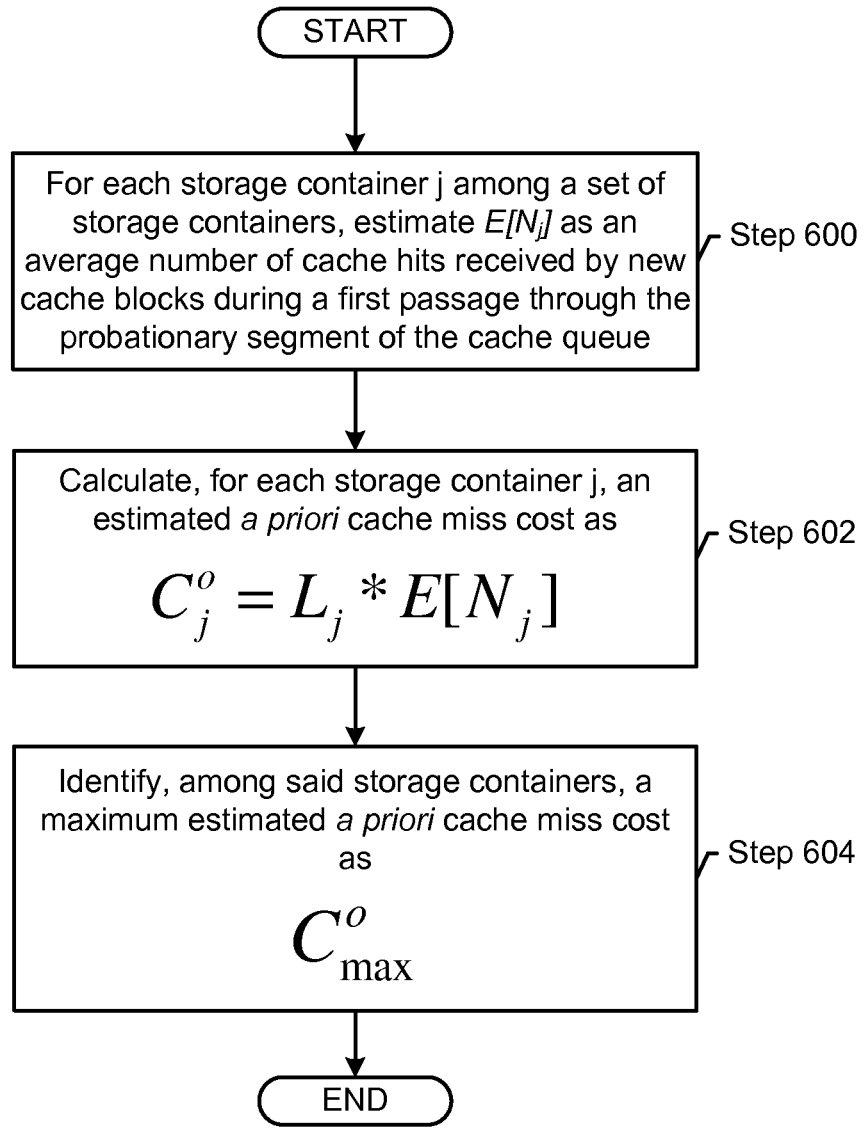

FIG. 6 shows a flowchart in accordance with one or more embodiments of the invention. The steps of the flowchart shown in FIG. 6 may be used to calculate an estimated cache miss cost for a cache block. Those skilled in the art, having the benefit of this detailed description, will appreciate the order and number of steps shown in FIG. 6 may differ among embodiments of the invention. Further, one or more steps in FIG. 6 may be optional and/or may be performed in any combination of different orders.

In STEP 600, for each storage container j among a set of storage containers, the expected number of cache hits ($E[N_j]$) to a new cache block from the storage container j during a first passage through the cache queue is estimated. $E[N_j]$ may be estimated as an average number of cache hits received by new cache blocks during a first passage through a probationary segment of the cache queue. In one or more embodiments of the invention, each storage container of the set of storage containers has at least one cache block in the cache queue. $E[N_j]$ may be calculated for any predefined number of cache blocks of the storage container, in accordance with various embodiments of the invention. For example, a cache manager (e.g., cache manager (140) of FIG. 1A, discussed above) may track the number of cache hits during a first passage for the last 10 new cache blocks from a storage container j. The cache manager (140) may then take an average of these 10 to be used as an estimate of the expected number of cache hits for one or more new cache blocks from storage container j.

In STEP 602, an estimated a priori cache miss cost ($C_j^0$) (i.e., an estimated cache miss cost) is calculated for each storage container j. In one or more embodiments of the invention, the estimated a priori cache miss cost ($C_j^0$) is calculated as $C_j^0 = L_j * E[N_j]$, where $L_j$ is a latency of the storage container j. The latency ($L_j$) may be a time required by the storage device of the container j to access, retrieve, and/or modify a value of a storage block within the storage container j. The estimated a priori cache miss cost may be calculated based on any mathematical formula of the latency and/or expected number of hits ($E[N_j]$) (including any linear and/or exponential variations of the formula shown).

In STEP 604, a maximum estimated a priori cache miss cost ($C_{max}^0$) is identified among the estimated a priori cache miss costs. In one or more embodiments of the invention, a cache manager (e.g., cache manager (140) of FIG. 1A, discussed above) may track the maximum estimated a priori cache miss cost ($C_{max}^0$) as the cache queue changes and/or iterate through the storage containers periodically in order to identify the maximum estimated a priori cache miss cost ($C_{max}^0$) as needed.

Figure 7:
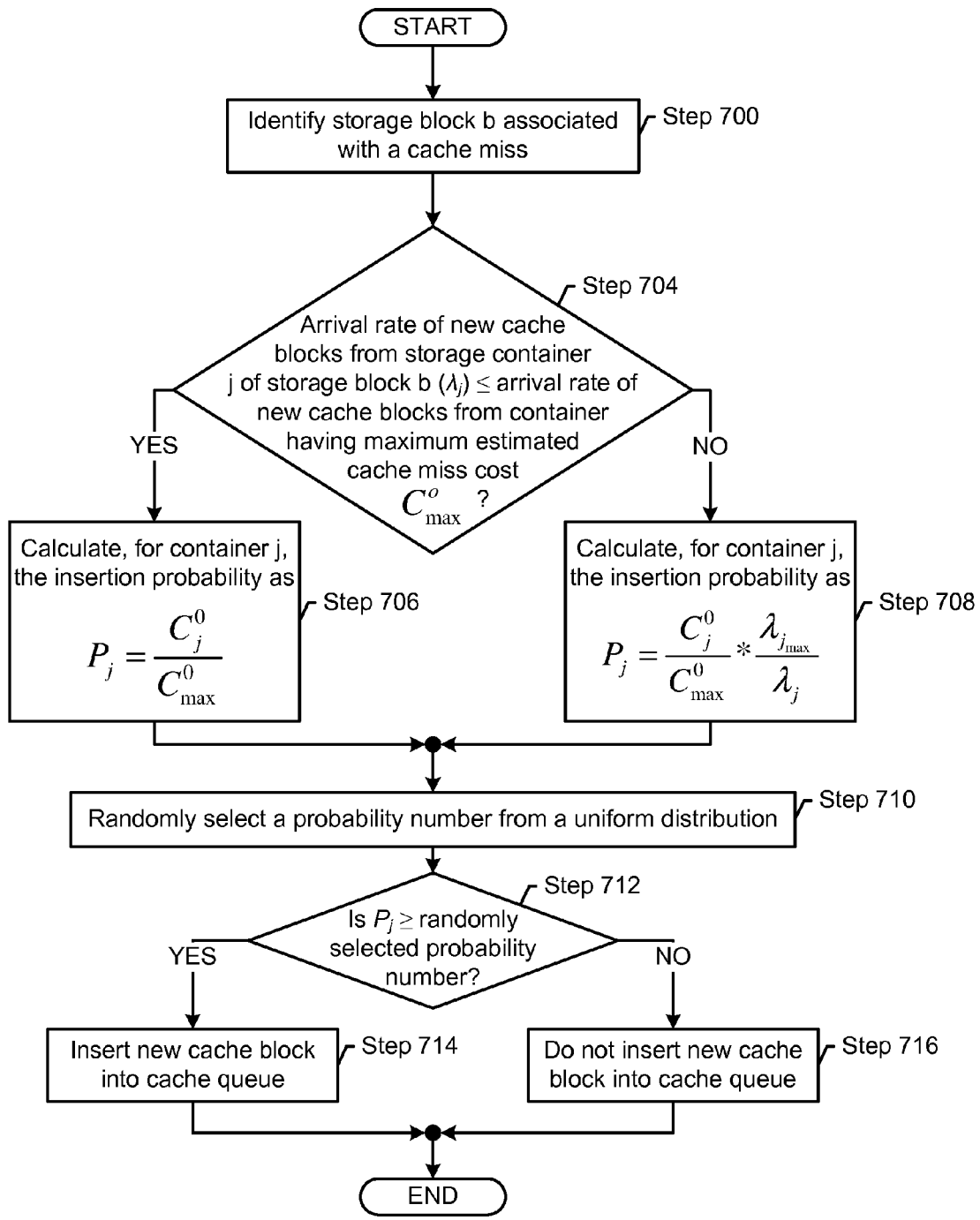

FIG. 7 shows a flowchart in accordance with one or more embodiments of the invention. The steps of the flowchart shown in FIG. 7 may be used to probabilistically insert a cache block into a cache queue. Those skilled in the art, having the benefit of this detailed description, will appreciate the order and number of steps shown in FIG. 7 may differ among embodiments of the invention. Further, one or more steps in FIG. 7 may be optional and/or may be performed in any combination of different orders.

In STEP 700, a storage block b associated with a cache miss is identified. The cache miss may be any type of cache miss (e.g., a cache read miss, cache write miss) requiring and/or initiating an access to the storage block b. The storage block may be accessed immediately after the cache miss and/or at any future time (e.g., in response to a periodic write-back request).

In STEP 704, it is determined whether the arrival rate ($\lambda_j$) of new cache blocks from a storage container j of storage block b is less than or equal to the arrival rate of new cache blocks from the storage container having the maximum estimated cache miss cost ($C_{max}^0$). An arrival rate of new cache blocks for a storage container may be an estimated and or calculated number of new cache blocks corresponding to the storage container which are inserted into the cache queue per given time period (e.g., 100 milliseconds) or number of cache operations (e.g., 200 cache block insertions). The storage container having the maximum estimated cache miss cost ($C_{max}^0$) may refer to any storage container having the maximum estimated cache miss cost among any set of storage containers in accordance with one or more embodiments of the invention (e.g., maximum estimated a priori cache miss cost as shown in FIG. 6, discussed above). In one or more embodiments of the invention, if the arrival rate ($\lambda_j$) of new cache blocks from storage container j (i.e., corresponding to storage container j) is less than or equal to the arrival rate of new cache blocks from the storage container having the maximum estimated cache miss cost ($C_{max}^0$), the process proceeds to STEP 706. In one or more embodiments of the invention, if the arrival rate ($\lambda_j$) of new cache blocks from storage container j (i.e., corresponding to storage container j) is greater than the arrival rate of new cache blocks from the storage container having the maximum estimated cache miss cost ($C_{max}^0$) the process proceeds to STEP 708.

In STEP 706, an insertion probability is calculated for the storage container j based on the estimated cache miss cost ($C_j^0$). In one or more embodiments of the invention, the insertion probability is calculated as $$P_j = \frac{C_j^0}{C_{max}^0}.$$

In one or more embodiments of the invention, the formula for calculating the insertion probability is not based upon an arrival rate of new cache blocks for the storage container j. Any formula where $P_j$ is an increasing function of $C_j^0$ may be used to calculate the estimated access rate (including any linear and/or exponential variations of the formula shown).

In STEP 708, an insertion probability is calculated for the storage container j based on the estimated cache miss cost ($C_j^0$) and the arrival rate ($\lambda_j$) of new cache blocks from storage container j. In one or more embodiments of the invention, the insertion probability is calculated as $$P_j = \frac{C_j^0}{C_{max}^0} * \frac{\lambda_{j_{max}}}{\lambda_j}.$$

where $\lambda_{j_{max}}$ is the highest arrival rate among a set of storage containers. In one or more embodiments of the invention, the set of storage containers includes all storage containers having one or more cache blocks in the cache queue or a segment of the cache queue. Alternatively, in one or more embodiments of the invention, the set of storage containers includes all storage containers which are tracked by a cache manager (e.g., cache manager (140) of FIG. 1A, discussed above). In one or more embodiments of the invention, the formula for calculating the insertion probability is based upon an arrival rate of new cache blocks for the storage container j. Any formula where $P_j$ is an increasing function of $C_j^0$ may be used to calculate the insertion probability (including any linear and/or exponential variations of the formula shown).

In STEP 710, a probability number is randomly selected from a uniform distribution. In one or more embodiments of the invention, the range of the uniform distribution is the same as the range of the insertion probability ($P_j$) calculated in STEP 706 and/or STEP 708. The probability number may be obtained from any number of sufficiently random processes which produce a random distribution (within a given tolerance). Any method of random number generation may be used. For purposes of this disclosure, random selection may refer to any method which is capable of producing a range of possible outcomes suitable for usage in probabilistic analysis. Random number generation and random number as used herein may include pseudo random number generation and pseudo random number, respectively, without departing from the scope of the invention.

In STEP 712, it is determined whether the insertion probability ($P_j$) is greater than or equal to the probability number. If the insertion probability is greater than or equal to the probability number, the process proceeds to STEP 714. If not, the process proceeds to STEP 716. For example, if given a possible range of 0 to 100 for both numbers, if the insertion probability is 45 and the probability number is 40, the process proceeds to STEP 714. In one or more embodiments of the invention, STEPS 706, 708, 710, and 712 may use any method of comparing the insertion probability to a random number selected from a uniform distribution. Thus, in one or more embodiments of the invention, a given cache block b is more likely to be inserted if it has a higher insertion probability.

In STEP 714, a new cache block is inserted into the cache queue for the storage block (b) associated with the cache miss. Thus, the value of storage block b is stored within a memory unit corresponding to the cache block In one or more embodiments of the invention, a cache block is evicted from the cache queue prior to insertion of the new cache block and one or more existing cache blocks are recycled within the cache queue.

In STEP 716, no new cache blocks are inserted into the cache queue in response to the cache miss. Thus, in one or more embodiments of the invention, the storage block (b) corresponding to the cache miss is accessed without modification to the cache or cache queue.

Figure 9:
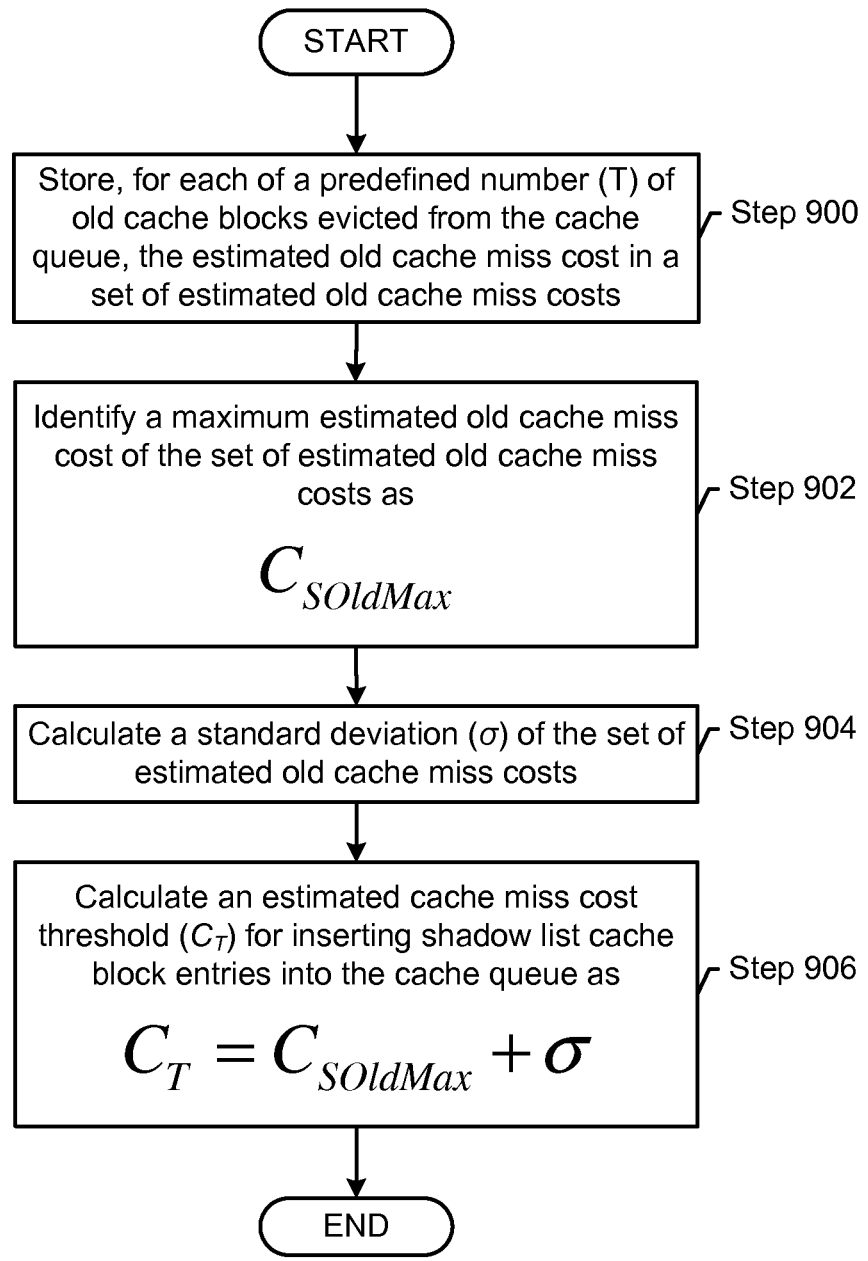

FIG. 9 shows a flowchart in accordance with one or more embodiments of the invention. The steps of the flowchart shown in FIG. 9 may be used to calculate an estimated cache miss cost threshold for insertion of cache blocks into a cache queue. Those skilled in the art, having the benefit of this detailed description, will appreciate the order and number of steps shown in FIG. 9 may differ among embodiments of the invention. Further, one or more steps in FIG. 9 may be optional and/or may be performed in any combination of different orders.

In STEP 900, for each of a predefined number (T) of old cache blocks evicted from the cache queue, an estimated old cache miss cost is stored in a set of estimated old cache miss costs. The predefined number (T) may be the same as the specified number of transactions over which container statistics are maintained and/or may be any number as defined by an authorized user or entity communicatively connected to a cache manager (e.g., cache manager (140) of FIG. 1A, discussed above). In one or more embodiments of the invention, the set of estimated old cache miss costs are calculated over a moving window of past cache operations (i.e., updated after each cache operation). The estimated old cache miss cost may be calculated using any process and/or formula for calculating estimated cache miss costs as disclosed herein. In one or more embodiments of the invention, the estimated old cache miss cost is calculated using the process of FIG. 2 (discussed above). The calculation may take place synchronously or asynchronously and may occur prior to detection of a cache miss and/or after detection of a cache miss. The set of estimated cache miss costs may be stored within a set of cache block objects corresponding to the set of evicted old cache blocks and/or one or more data structures corresponding to the old cache blocks.

In STEP 902, a maximum estimated old cache miss cost ($C_{SOldMax}$) is identified among the set of estimated old cache miss costs. In one or more embodiments of the invention, identifying the maximum estimated old cache miss cost ($C_{SOldMax}$) may take place synchronously or asynchronously and may occur prior to detection of a cache miss and/or after detection of a cache miss.

In STEP 904, a standard deviation ($\sigma$) of the set of estimated old cache miss costs is calculated. The standard deviation may be a square root of a variance of the set of estimated old cache miss costs. In one or more embodiments of the invention, calculating the standard deviation is performed as follows:

1) An average estimated old cache miss cost of the set of estimated old cache miss costs is calculated.
2) Calculate, for each estimated old cache miss cost, a deviation from the average by subtracting the average estimated old cache miss cost from the estimated old cache miss cost.
3) A set of squares is calculated by squaring the deviations (i.e., multiplying each deviation by itself).
4) A summation of the set of squares is calculated.
5) A variance of the set of estimated old cache miss costs is calculated by dividing the summation of the set of squares by the cardinality of the set of estimated old cache miss costs minus one.
6) A standard deviation is calculated by taking a square root of the variance.

Other techniques may be used to calculate the standard deviation without departing from the scope of the invention.

In STEP 906, an estimated cache miss cost threshold ($C_T$) is calculated for inserting cache blocks into a cache queue for storage blocks having an entry in a shadow list. In one or more embodiments of the invention, the estimated cache miss cost threshold ($C_T$) may be calculated using any formula of the maximum estimated old cache miss cost ($C_{SOldMax}$) and/or the standard deviation. In one or more embodiments of the invention, the estimated cache miss cost threshold is calculated as $C_T = C_{SOldMax} + \sigma$. Any formula where $C_T$ is an increasing function of $C_{SOldMax}$ may be used to calculate the estimated cache miss cost threshold ($C_T$) (including any linear and/or exponential variations of the formula shown).

Figure 10:
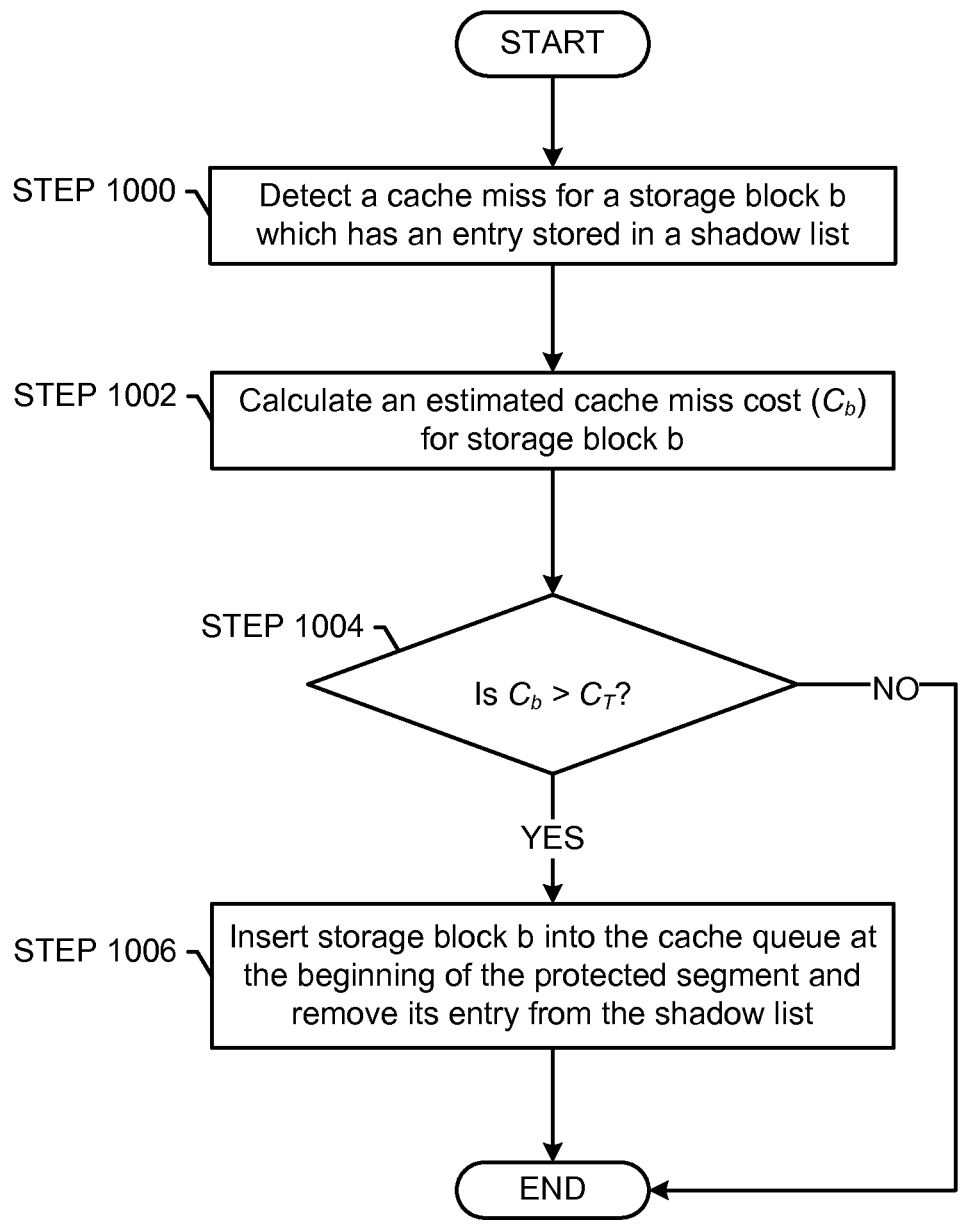

FIG. 10 shows a flowchart in accordance with one or more embodiments of the invention. The steps of the flowchart shown in FIG. 10 may be used to insert a cache block into a cache queue and a value into a memory unit of the cache for a storage block having an entry in a shadow list. Those skilled in the art, having the benefit of this detailed description, will appreciate the order and number of steps shown in FIG. 10 may differ among embodiments of the invention. Further, one or more steps in FIG. 10 may be optional and/or may be performed in any combination of different orders.

In STEP 1000, a cache miss is detected for a storage block b having a corresponding entry in a shadow list (e.g., old block shadow list (849) of FIG. 8A or new block shadow list (899) of FIG. 8B, discussed above). In one or more embodiments of the invention, the storage block b does not have a corresponding memory unit within the cache and is therefore un-cached. Thus, the cache miss may require a disk access to the storage block b on a storage device. In one or more embodiments of the invention, the cache block entry of storage block b is an old cache block entry stored within an old block shadow list. The cache block entry of storage block b has an accumulated number of accesses that is greater than 2 (including an access resulting from a cache miss, which resulted in a prior insertion of a cache block into the cache queue). In one or more embodiments of the invention, the cache block entry of storage block b is a new cache block entry stored within an old block shadow list, and has an accumulated number of accesses equal to 2 (including an access resulting from a cache miss which resulted in a prior insertion of a cache block into the cache queue). The access resulting from the cache miss may be performed at any time after the cache miss and may be delayed until after execution of one or more cache operations in accordance with one or more embodiments of the invention.

In STEP 1002, an estimated cache miss cost ($C_b$) is calculated for the storage block b. This estimated cache miss cost may be calculated in accordance with one or more of the methods for calculating an estimated cache miss cost as disclosed herein (e.g., the process of FIGS. 2 and 3, discussed below). The estimated cache miss cost may also be stored from a previous calculation which occurred prior to eviction of a cache block corresponding to storage block b from the cache queue. In one or more embodiments of the invention, the estimated cache miss cost ($C_b$) is a value calculated for a storage container of the storage block (b) and is a uniform value for all storage blocks within the storage container. In one or more embodiments of the invention, for a storage block b having an entry in a shadow list, the accumulated number of accesses for the entry is incremented. In one or more embodiments of the invention, for a storage block b having an entry in a new block shadow list, the entry is evicted from the new block shadow list and inserted into an old block shadow list.

In STEP 1004, it is determined whether the estimated cache miss cost ($C_b$) exceeds the estimated cache miss cost threshold ($C_T$). If the estimated cache miss cost ($C_b$) exceeds the estimated cache miss cost threshold ($C_T$), the process proceeds to STEP 1006. If the estimated cache miss cost ($C_b$) does not exceed the estimated cache miss cost threshold ($C_T$), the process ends.

In STEP 1006, a cache block corresponding to storage block b is inserted into the cache queue. In one or more embodiments of the invention, a cache block is inserted at a beginning of a protected segment of the cache queue and a corresponding entry is removed from the shadow list. In one or more embodiments of the invention, the cache block inherits and/or maintains one or more cache block attributes from a shadow list entry for storage block b between any number of evictions from the cache queue as long as an entry in the shadow list for the evicted cache block exists. In one or more embodiments of the invention, for the storage block b, if a cache block does not exist within the cache queue or if an entry does not exist within one or more shadow lists at any given time, the cache block attributes are reset and/or forgotten.

In one or more embodiments of the invention, one or more shadow lists are activated after a warm-up period for the cache queue is complete. The warm-up period may be a period ending when the cache queue contains a predefined percentage/number of old cache blocks and/or when a predefined number of most frequently accessed old cache blocks are identified for a predefined number of storage containers.

In one or more embodiments of the invention, after activation of the shadow list(s), a predefined number (T) of cache operations are executed before inserting any cache block entries into the shadow list(s). The predefined number may be the same as the specified number of transactions over which container statistics are maintained or may be any number as defined by an authorized user or entity communicatively connected to the cache manager (140).

As insertion into one or more shadow lists begins, in one or more embodiments of the invention, the estimated cache miss costs, the standard deviation, and/or related properties of cache block entries in the shadow list(s) are updated after every transaction and/or after the predefined number of transactions. Thus, a moving window of transactions may be used to calculate and/or refresh these values periodically.

In one or more embodiments of the invention, storage blocks having cache block entries within a shadow list (e.g., new block shadow list (899) of FIG. 8B, discussed above) must be accessed at least twice (while having entries in the shadow list) before being re-inserted into the cache. Thus, in one or more embodiments of the invention, after an initial access while in the shadow list, the cache block entry remains in the shadow list and its number of accesses is incremented. In one or more embodiments of the invention, after an initial access while in a new block shadow list (e.g., new block shadow list (899) of FIG. 8B, discussed above), the cache block entry is removed from the new block shadow list and inserted into the beginning of an old block shadow list (e.g., old block shadow list (849) of FIG. 8A, discussed above). Thus, in one or more embodiments of the invention, in order for a storage block having a cache block entry in a shadow list to be re-inserted into the cache, the storage block's entry in the shadow list must have a total number of accesses since insertion into the cache of three.

In one example, a cache manager (e.g., cache manager (140) of FIG. 1A, discussed above) detects a read cache miss corresponding to a storage block z. In this example, an old block shadow list and a new block shadow list are operatively connected to a cache queue. The old block shadow list stores entries for old cache blocks which are evicted from the cache queue and the new block shadow list stores entries for new cache blocks which are evicted from the cache queue. In response to the cache miss, the cache manager searches both shadow lists for an entry corresponding to the storage block. No entry is found within the shadow lists corresponding to the storage block. Thus, the storage block is accessed and a value is read.

Continuing the example, a storage container y of the storage block z is identified among a set of storage containers having at least one cache block in the cache queue. For each storage container j among the set, the expected number of cache hits ($E[N_j]$) to a new cache block from the storage container j during a first passage through the cache queue is estimated. $E[N_j]$ is estimated as an average number of cache hits received by new cache blocks during a first passage through a probationary segment of the cache queue. The average number of cache hits is calculated for the last 10 cache blocks inserted into the cache queue (for each container of the set). For the storage container y, the average number of cache hits is calculated to be 1.25. For each storage container j of the set, an estimated a priori cache miss cost is calculated as $C_j^0 = L_j * E[N_j]$, where $L_j$ is a latency value of 0.5 milliseconds. The estimated a priori cache miss cost of storage container y is calculated as $C_y^0 = 0.5*1.25 = 0.625$. A maximum estimated a priori cache miss cost ($C_{max}^0 = 3.115$) is also identified among the set. For each storage container j of the set of storage containers, an arrival rate of new cache blocks is also calculated. The arrival rate is calculated as the number of new cache blocks for the container arriving in the cache queue every second. The arrival rate ($\lambda_y$) of storage container y is equal to 4. The arrival rate ($\lambda_{j_{max}} = 3.5$) of the storage container having $C_{max}^0$ is also identified. The estimated a priori cache miss costs and the arrival rates are stored within container statistic objects by the cache manager.

Continuing the example, a container statistic object for the storage container of the storage block is accessed. The arrival rate of the storage container and the estimated a priori cache miss cost are obtained from the container statistic object. The cache manager determines that the arrival rate of the storage container is greater than the arrival rate of the storage container having $C_{max}^0$ (discussed above). The cache manager then calculates an insertion probability for the storage container y as $$P_y = \frac{C_y^0}{C_{max}^0} * \frac{\lambda_{jmax}}{\lambda_y} = \frac{0.625}{3.115} * \frac{3.5}{4} = 0.176.$$

Next, in the example, the cache manager generates a random number from a uniform distribution between zero and 1. The random number is 0.142. The cache manager creates a new cache block J for insertion into the cache queue for storage block z since the insert probability ($P_j$=0.176) is greater than or equal to the random number (0.142).

Figure 5A:
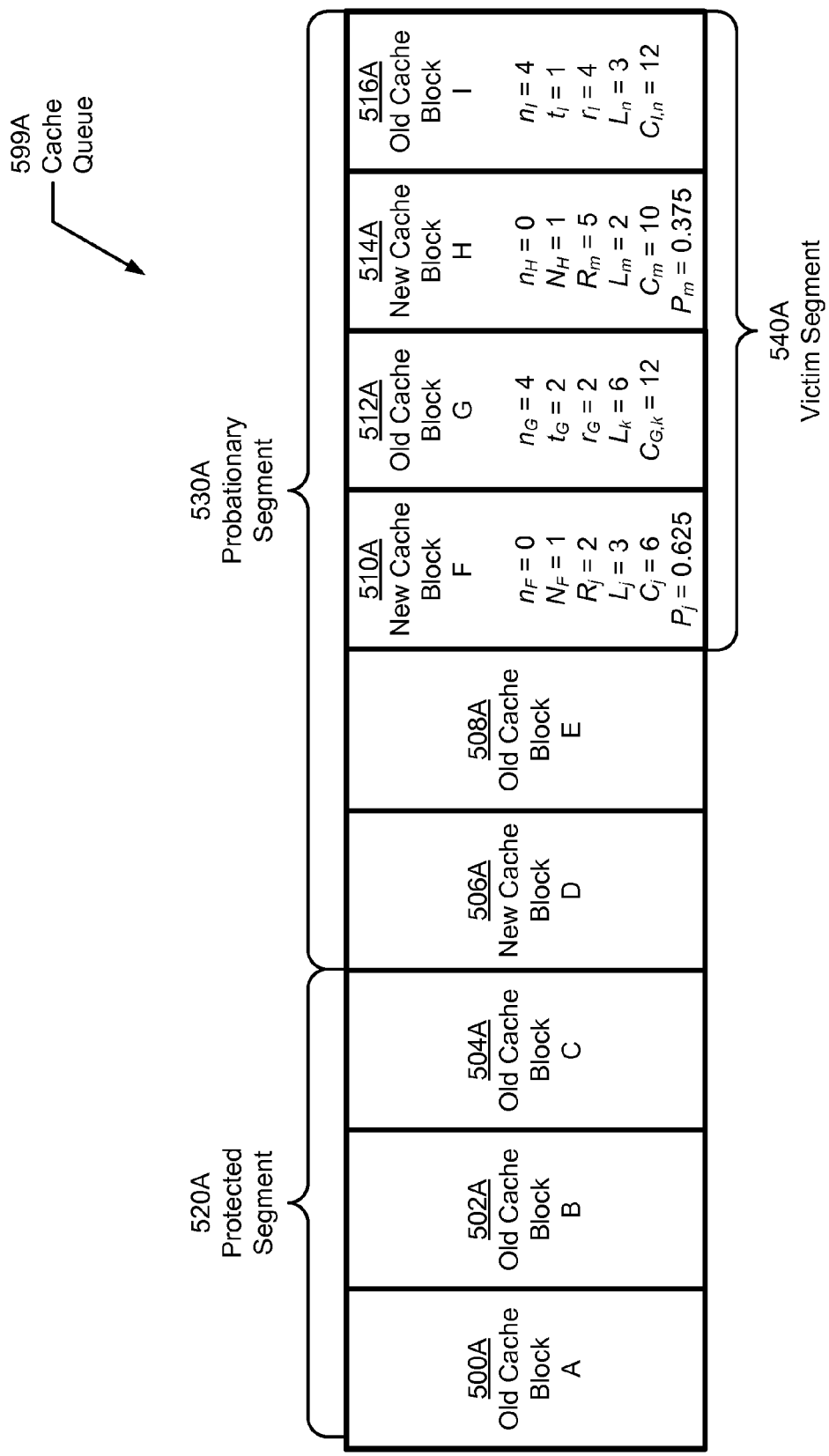
FIGS. 5A, 5B, and 5C depict examples of a cache queue in accordance with one or more embodiments of the invention.

Continuing the example, FIG. 5A shows an example cache queue (599A) having a protected segment (520A), a probationary segment (530A), and a victim segment (540A) in accordance with one or more embodiments of the invention. The cache queue also includes a set of old cache blocks (500A, 502A, 504A, 508A, 512A, 516A) and a set of new cache blocks (506A, 510A, 514A). In the example shown, the cache queue (599A) must evict a cache block in order to insert the new cache block for storage block z. In order to do so, a cache manager (e.g., cache manager 140 of FIG. 1, discussed above) operatively connected to the cache calculates an estimated cache miss cost for each old cache block (512A, 516A) in the victim segment (540A).

The estimated cache miss costs of the old cache blocks are calculated by first calculating an estimated access rate ($r_b$) of each old cache block b as $r_b=n_b/t_b$, where $n_b$ is a number of hits received by the old cache block b during a current passage through the cache queue and $t_b$ is the time elapsed since the old cache block b was inserted into the cache queue. Based on the estimated access rates, the cache manager calculates the estimated cache miss costs as $C_{b,j}=L_j*r_b$, where $L_j$ is a latency (time in milliseconds) for the storage container j of the old cache block b. Other timescales may be used without departing from the scope of the invention. Within the victim segment, the estimated access rate of old cache block I (516A) is calculated as $r_I=n_I/t_I=4/1=4$. The estimated cache miss cost of old cache block I (516A) is calculated as $C_{I,n}=L_n*r_I=3*4=12$. Similar calculations are performed for old cache block G (512A) which is the only other old cache block in the victim segment.

Continuing the example, the cache manager, after detecting that new cache blocks (510A, 514A) are present within the victim segment (540A), begins examining new cache blocks in the victim segment sequentially, working backwards from the end of the cache queue. In this order, the first new cache block is identified as new cache block H (514A). First, the cache manager determines whether new cache block H (514A) has made at least two passages through the probationary segment.

Since this condition is not met, (i.e., new cache block H (514A) is within a first passage ($N_H$=1)), the cache manager proceeds to calculate an estimated cache miss cost ($C_m$) of new cache block H (514A). The storage container (m) of new block H has an estimated access rate of 5 ($R_m$=5). The cache manager calculated this number over a previous time interval by tracking a fraction of "recycled" new cache blocks in the storage container m that received zero cache hits during their first passage through the probationary segment and subsequently received at least one cache hit during their second passage. In this example, the fraction was detected to be 0.5. This fraction is then used to calculate the estimated access rate for new cache blocks from a storage container m as $R_m=P(A|B_m)/T_m=0.5/10=5$, where $T_m$ is the average time spent (in milliseconds, for example) in the cache by a new cache block from storage container m before receiving a cache hit during a second passage through the probationary segment. Finally, the estimated cache miss cost for the storage container M of new cache block H is calculated as $C_m=L_m*R_m=2*5=10$, where $L_m$ is the latency for the storage container m is 2 milliseconds.

At this point, in one or more embodiments of the invention, the cache manager identifies a lowest estimated cache miss cost of the old cache blocks in the victim segment as 12 (the estimated cache miss costs of old cache blocks G (512A) and I (516A) are equal). The cache manager then performs a check to determine whether new cache block H (514A) is within a first passage through the cache queue and has an estimated cache miss cost which is less than the lowest estimated cache miss cost among old cache blocks in the victim segment (540A). Since both conditions are met ($N_H$=1 and $C_m$<12), the cache manager proceeds to calculate a removal probability ($P_m$) for new cache block H (514A). In order to do this, the estimated cache miss costs of all storage containers having new cache blocks in the victim segment are calculated. In order to do this, the above process is performed for the only remaining new cache block F (510A) within the victim segment (540A) and all corresponding values for new cache block F (510A) and its corresponding storage container j are calculated by the cache manager accordingly ($n_F$=0, $N_F$=1, $R_j$=2, $L_j$=3, $C_j$=6). Returning to the calculation of a removal probability ($P_m$) for new cache block H (514A), a scaling factor is calculated as $$P_{z_{min}} = 1 \bigg/ \bigg(C_{z_{min}} * \sum_{j \in V} 1/C_j\bigg),$$

where $C_{z_{min}}$ is a lowest estimated cache miss cost among the storage containers having one or more new cache blocks in the victim segment ($C_{z_{min}}=C_j=6$). Thus, the scaling factor is calculated to be $$P_{z_{min}} = 1 \bigg/ \bigg(6 * \bigg(\frac{1}{6} + \frac{1}{10}\bigg)\bigg) = 0.625.$$

Using the scaling factor, the removal probability ($P_m$) for new cache block H (514A) is calculated as $P_m=P_{z_{min}}*(C_{z_{min}}/C_m)=0.625*(6/10)=0.375$.

Next, the cache manager generates a random number from a uniform distribution between zero and 1. The random number is 0.533. The cache manager determines not to evict new cache block H (514A) from the cache queue (599A) since the removal probability ($P_m$=0.375) is not greater than or equal to the random number (0.533).

The cache manager then continues sequential analysis of the new cache blocks in the cache queue (599A) by determining whether new cache block F (510A) has made at least two passages through the probationary segment. Since this condition is not met, (i.e., new cache block F (510A) is within a first passage ($N_F$=1)), the cache manager proceeds to calculate a removal probability ($P_j$) of new cache block F (510A) as $P_j = P_{z_{min}} * (C_{z_{min}}/C_j) = 0.625*(6/6) = 0.625$. The cache manager determines that the removal probability ($P_j$=0.625) of new cache block F (510A) is greater than the random number (0.533) and thus evicts new cache block F (510A) from the cache queue (599A).

Continuing the example, the cache manager determines that evicted new cache block F did not complete two or more passages through the cache queue prior to eviction. Thus, the cache manager inserts a cache block entry F at the beginning of the new block shadow list having a storage block index of cache block F, a storage container index of the storage container of cache block F, a number of total accesses to cache block F, and a time of the first access for cache block F. In order to create room for insertion of cache block entry F into the new block shadow list, the cache block entry at the end of the new block shadow list is evicted and all other entries in the list are moved downward (i.e., towards the end).

Figure 5B:
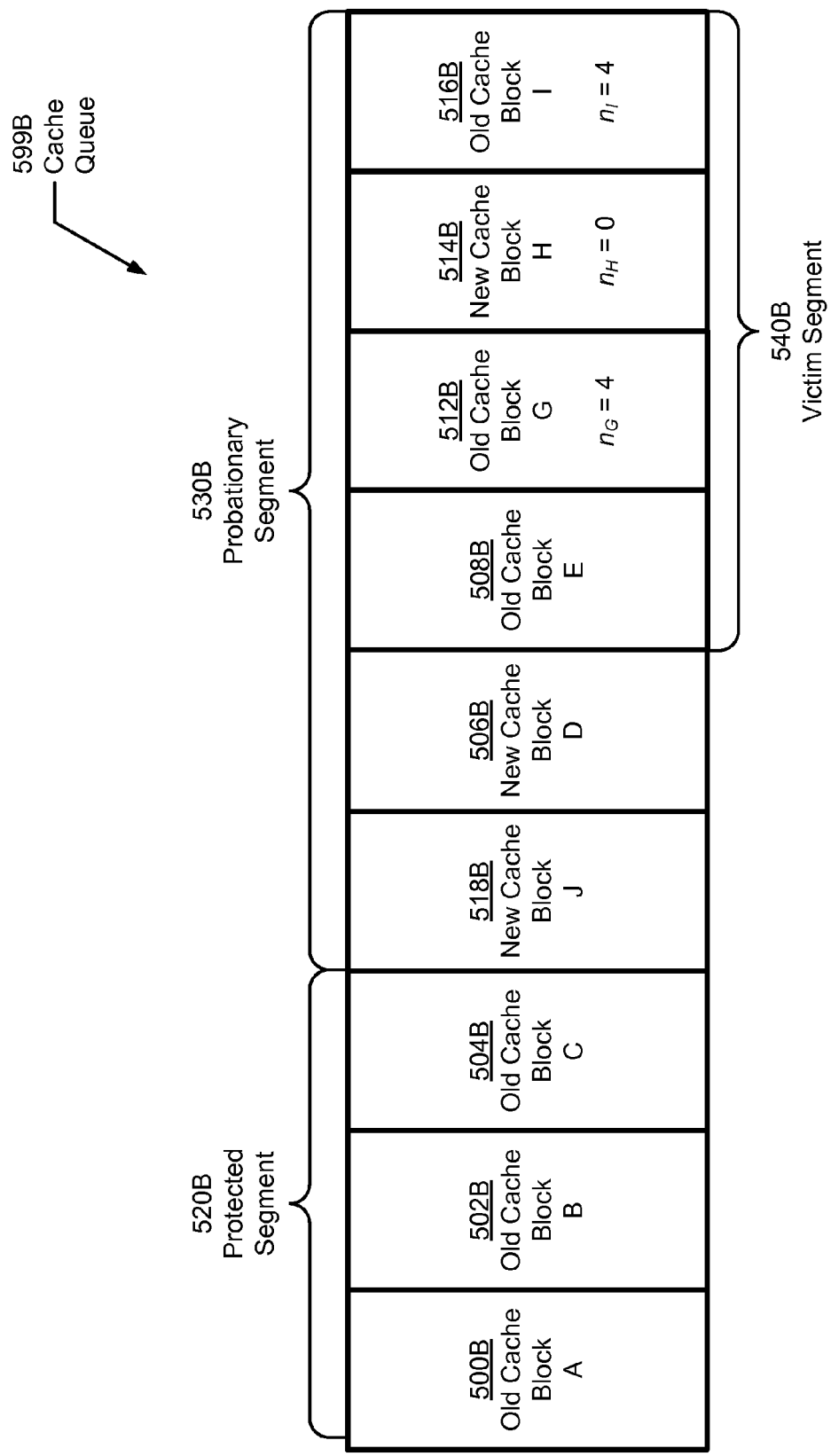

FIG. 5B shows an example cache queue (599B) having a protected segment (520B), a probationary segment (530B), and a victim segment (540B) in accordance with one or more embodiments of the invention. The cache queue includes a set of old cache blocks (500B, 502B, 504B, 508B, 512B, 516B) and a set of new cache blocks (518B, 506B, 514B). In a continuation of the example described above (with reference to FIG. 5A), FIG. 5B depicts the state of the cache queue (599B) after insertion of the new cache block J (518B) (discussed above) at a top of the probationary segment (530B). Those existing cache blocks which were within the probationary segment (530B) and came before (i.e., closer to the beginning of the cache queue (599B)) the evicted cache block were shifted towards the end of the cache queue (599B). The shifted cache blocks are new cache block D (506B) and old cache block E (508B). This depiction shows the cache queue (599B) prior to the execution of a recycle operation which is performed after insertion of new blocks.

Figure 5C:
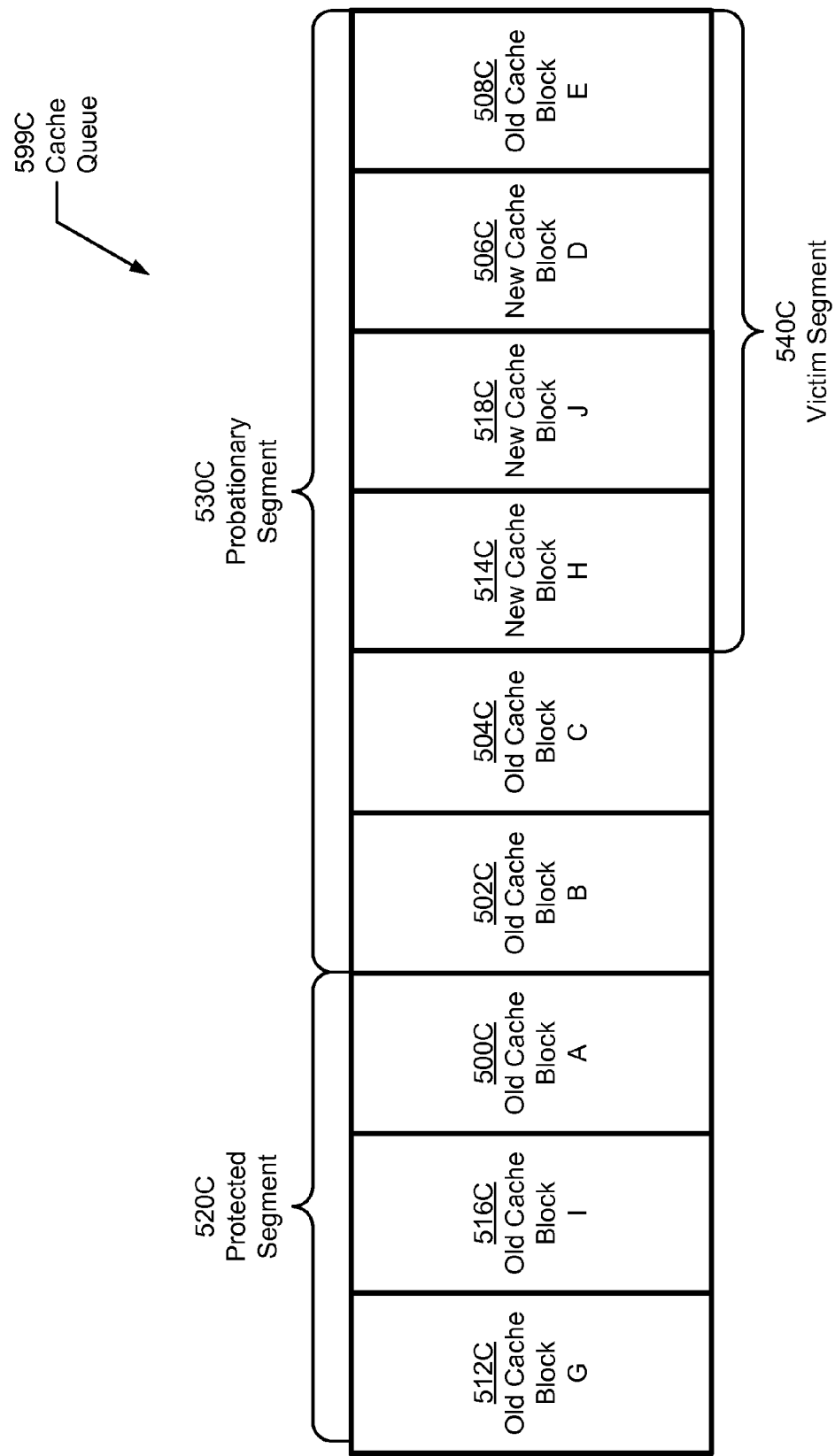

FIG. 5C shows an example cache queue (599C) having a protected segment (520C), a probationary segment (530C), and a victim segment (540C) in accordance with one or more embodiments of the invention. The cache queue includes a set of old cache blocks (500C, 502C, 504C, 508C, 512C, 516C) and a set of new cache blocks (518C, 506C, 514C). In a continuation of the example described above (with reference to FIGS. 5A and 5B), FIG. 5C depicts the state of the cache queue (599C) after a recycle operation is executed. After the insertion of new cache block J (518C), those existing cache blocks which were within the victim segment (530C) and came after the last evicted cache block (i.e., closer to the end of the cache queue (599C)) were recycled based on a number of hits received during a current passage through the cache queue (599C). Those cache blocks which had received zero cache hits during their current passage through the cache queue (599C) were recycled to the top of the probationary segment (530C) while those cache blocks which received at least one cache hit during their current passage were recycled to the top of the protected segment (520B). Thus, old cache block I (516C) was first recycled to a top of the protected segment since $n_I$=4<0. Next, new cache block H (514C) was recycled to a top of the probationary segment since $n_H$=0. Finally, old cache block G (512C) was recycled to a top of the protected segment since $n_G$=4<0. Each time a cache block is recycled, the cache manager pushes the existing cache blocks towards the end of the cache queue in order to make room for the recycled block at a top of the probationary segment (530B) or the protected segment (520B).

Figure 11:
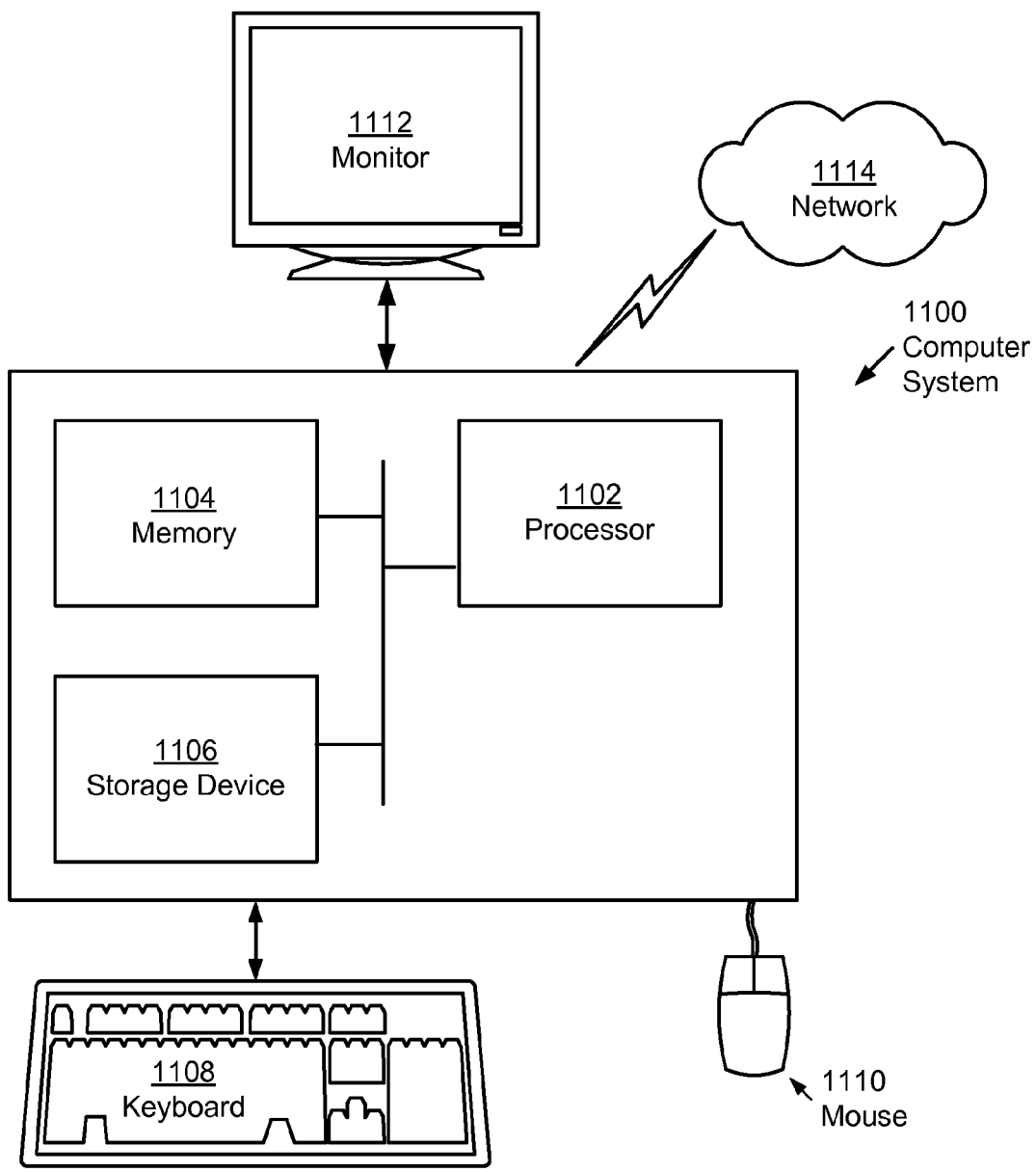
FIG. 11 depicts a computer system in accordance with one or more embodiments of the invention.

Embodiments of the invention may be implemented on virtually any type of computer regardless of the platform being used. For example, as shown in FIG. 11, a computer system (1100) includes one or more processor(s) (1102) (such as a central processing unit (CPU), integrated circuit, hardware processor, etc.), associated memory (1104) (e.g., random access memory (RAM), cache memory, flash memory, etc.), a storage device (1106) (e.g., a hard disk, an optical drive such as a compact disk drive or digital video disk (DVD) drive, a flash memory stick, etc.), and numerous other elements and functionalities typical of today's computers (not shown). The computer system (1100) may also include input means, such as a keyboard (1108), a mouse (1110), or a microphone (not shown). Further, the computer system (1100) may include output means, such as a monitor (1112) (e.g., a liquid crystal display (LCD), a plasma display, or cathode ray tube (CRT) monitor). The computer system (1100) may be connected to a network (1114) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1100) includes at least the minimal processing, input, and/or output means necessary to practice embodiments of the invention.

Further, in one or more embodiments of the invention, one or more elements of the aforementioned computer system (1100) may be located at a remote location and connected to the other elements over a network. Further, embodiments of the invention may be implemented on a distributed system having a plurality of nodes, where each portion of the invention (e.g., cache manager (140), cache (100), storage device (110), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By gathering container statistics for storage containers in a storage device, it is possible to more accurately estimate cache miss costs based on historical data for nearby storage blocks within the storage containers.

One or more embodiments of the invention have one or more of the following advantages. By removing cached items from a cache probabilistically, it is possible to reduce memory accesses and reduce the total cost associated with cache misses. Additionally, probabilistic removal of cache items allows greater adaptability to workload changes.

One or more embodiments of the invention have one or more of the following advantages. By inserting items into a cache probabilistically, it is possible to reduce memory accesses and reduce the total cost associated with cache misses. Additionally, probabilistic insertion of cache items allows greater adaptability to workload changes.

The following example data illustrates one or more advantages of the invention in one or more embodiments. In the examples, the analytical cache replacement (ANCR) algorithm refers to the process described by FIGS. 3, 4A, and 4B.

Also in the examples, the analytical cache replacement with shadow list (ANCR-S) algorithm refers to the ANCR algorithm including functionality to maintain an old block shadow list and a new block shadow list.

In the examples, a cache simulator is used to compare the ANCR and ANCR-S algorithms with the least recently used (LRU), segmented least recently used (SLRU), 2Q, and adaptive replacement cache (ARC) algorithms. For a cache size of N blocks, the probationary segment size for SLRU and ANCR was N/2. The statistics collection window T for ANCR is set equal to N and the victim segment size K is set equal to N/100. The size of the old block shadow list for the ANCR-S algorithm is set to 25% of the cache size and the size of the new block shadow list is set to 75% of the cache size.

Single Container Example

The first example focuses on the simple scenario of using only one container. The purpose of this example is to demonstrate that the ANCR algorithm does not need multiple heterogeneous containers to be present in order to achieve a smaller cache miss ratio than one or more existing cache replacement algorithms.

Continuing the first example, the first workload in this example consists of simulated TPC-C "New-Order" transactions. TPC-C is an industry-standard online transaction processing (OLTP) benchmark that simulates a complete computing environment where a population of users executes transactions against a database. In accordance with TPC-C specifications, the number of items accessed by each New-Order transaction is a randomly chosen integer from the range [5, 15]. There are 100000 items in the database, and the item number for each access is chosen using the following procedure. First, a random integer A is drawn from a uniform distribution on [1, 8191] and another integer B is drawn from a uniform distribution on [1,100000]. Then, these integers are converted into a binary format and a third integer C is obtained by performing a bitwise logical OR operation on the corresponding bits of A and B. For example, if the first bit of A is 0 and the first bit of A is 1, then the first bit of C is 1. If the second bit of A is 1 and the second bit of B is 1, then the second bit of C is 1. If the third bit of A is 0 and the third bit of B is 0, then the third bit of C is 0, and etc. The final item number is equal to C modulo 100000 plus 1. In order to abstract away the details of TPC-C that are not essential for our example, we assume that each item corresponds to a block of data, and hence we have a table with 100000 blocks that are accessed using the probability distribution specified above.

Continuing the first example, the total number of transactions processed during a simulation run was 10N. The cache was warming up for 8N transactions and then the last 2N transactions were treated as an evaluation time period, over which the cache miss ratio (the fraction of TPC-C item accesses that resulted in a cache miss) was computed. Enough repetitions of each simulation run were performed so that the difference in the cache miss ratio for any two algorithms would be statistically significant.

The results of this example are presented in Table 1 (below) for different values of the cache size N. Two versions of the 2Q algorithm were evaluated: 2Q(0.5) that set the old queue to be equal to 0.5 of the cache size and 2Q(0.95) that set the old queue to be equal to 0.95 of the cache size. The length of the old queue as a fraction of the cache size is the key parameter of the 2Q algorithm, and the results in Table 1 show that this parameter greatly affects the performance of the 2Q algorithm.

TABLE 1

Cache miss ratios for simulated TPC-C New-Order transactions

| Algorithm | N = 5,000 | N = 10,000 | N = 20,000 | N = 40,000 |
|---|---|---|---|---|
| LRU | 0.581 | 0.407 | 0.227 | 0.085 |
| 2Q(0.5) | 0.533 | 0.386 | 0.238 | 0.113 |
| 2Q(0.95) | 0.488 | 0.315 | 0.165 | 0.059 |
| SLRU | 0.501 | 0.342 | 0.187 | 0.065 |
| ARC | 0.482 | 0.339 | 0.199 | 0.075 |
| ANCR | 0.453 | 0.306 | 0.164 | 0.057 |
| ANCR-S | 0.433 | 0.294 | 0.157 | 0.054 |

As shown in Table 1, the ANCR and ANCR-S algorithms consistently obtained the smallest cache miss ratios of the algorithms tested.

Multi-Container Example

In a second example, the TPC-C item database is partitioned into 5 equal containers that hold the following ranges of item numbers: 1-20000, 20001-40000, 40001-60000, 60001-80000, and 80001-100000. Different latencies were assigned to different containers so as to see how they would impact the relative performance of the previously considered cache replacement algorithms. The access latency in some exemplary storage devices ranges from 0.1 ms for a flash disk to 62.5 ms for an 84% loaded SATA disk (which has a service rate $\mu$=100 IOPS, arrival rate $\lambda$=84 IOPS, and latency $1/(\mu-\lambda)$=0.0625 seconds). In order to cover this range of latencies, the latency of container j in this set of examples was $2^{5-j}$.

Continuing the second example, the total cache miss cost was used as the metric for evaluating the cache replacement algorithms in the presence of different container latencies. It was computed as the total sum, over all cache misses, of latencies incurred when accessing missed blocks on storage devices. The results in Table 2 (below) show that while the ranking of the considered cache replacement algorithms is the same as in Table 1, the difference between their cache miss costs is much larger, since the cost of not caching blocks from different containers varies greatly. ANCR and ANCR-S explicitly estimate the cost of not caching every block and so they are able to skew the distribution of cached blocks toward containers with higher latencies, while the other algorithms cannot do that.

TABLE 2

Cache miss costs in millions for simulated TPCC New-Order transactions when the item database was partitioned into 5 containers with different latencies.

| Algorithm | N = 5,000 | N = 10,000 | N = 20,000 | N = 40,000 |
|---|---|---|---|---|
| LRU | 11.4 | 16.2 | 18.3 | 12.9 |
| 2Q(0.5) | 10.5 | 15.4 | 19.3 | 18.3 |
| 2Q(0.95) | 7.7 | 10.1 | 10.8 | 7.6 |
| SLRU | 9.9 | 13.7 | 15.3 | 10.4 |
| ARC | 9.6 | 13.6 | 16.2 | 12.1 |
| ANCR | 6.5 | 9.0 | 10.7 | 7.2 |
| ANCR-S | 6.2 | 8.3 | 8.7 | 4.8 |

Continuing the second example, note that column 2 in Table 2 has larger cache miss costs than column 1 because the evaluation period was equal to 2N and hence more misses took place during the evaluation period for N=10000 than for N=5000. Eventually, for N=40000, the cache becomes so large that it covers almost all of the frequently accessed blocks, and even though more transactions are processed during the evaluation period, the actual number of cache misses decreases greatly, which explains why column 4 has smaller cache miss costs than column 3.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of inserting cache blocks into a cache queue, comprising:
    detecting, by a processor, a first cache miss for the cache queue;
    identifying, by the processor, a storage block receiving an access in response to the cache miss;
    calculating, by the processor, a first estimated cache miss cost for a first storage container comprising the storage block;
    calculating, by the processor, an insertion probability for the first storage container based on a mathematical formula of the first estimated cache miss cost;
    randomly selecting an insertion probability number from a uniform distribution, wherein the insertion probability exceeds the insertion probability number; and
    inserting, in response to the insertion probability exceeding the insertion probability number, a new cache block corresponding to the storage block into the cache queue.

2. The method of claim 1, wherein calculating the first estimated cache miss cost comprises:
    calculating an average number of cache hits received by a plurality of cache blocks corresponding to the first storage container in a first passage through a probationary segment of the cache queue;
    identifying a latency of the first storage container; and
    calculating, based on the average number of cache hits and the latency, the first estimated cache miss cost.

3. The method of claim 1, further comprising:
    calculating a plurality of estimated cache miss costs for a plurality of storage containers having cache blocks in the cache queue, wherein the plurality of estimated cache miss costs comprises the first estimated cache miss cost and the plurality of storage containers comprises the first storage container; and
    identifying a maximum estimated cache miss cost of the plurality of estimated cache miss costs corresponding to a second storage container of the plurality of storage containers, wherein the insertion probability is further based on the maximum estimated cache miss cost.

4. The method of claim 3, further comprising:
    identifying a first arrival rate of a plurality of new cache blocks for the first storage container, wherein the insertion probability is further based on the first arrival rate; and
    identifying a second arrival rate of a plurality of new cache blocks corresponding to the second storage container, wherein the first arrival rate exceeds the second arrival rate.

5. The method of claim 4, wherein the new cache block is inserted at a beginning of a probationary segment of the cache queue, and wherein the probationary segment comprises a contiguous set of cache blocks at an end of the cache queue.

6. The method of claim 1, further comprising:
    identifying, within the cache queue, a previous new cache block storing a value of a previous storage block;
    calculating, by the processor, a second estimated cache miss cost for a second storage container comprising the previous storage block;
    calculating, based on a mathematical formula of the second estimated cache miss cost, a removal probability for the second storage container;
    randomly selecting a removal probability number from the uniform distribution, wherein the removal probability exceeds the removal probability number; and
    evicting, in response to the removal probability exceeding the removal probability number and prior to inserting the new cache block into the cache queue, the previous new cache block from the cache queue.

7. The method of claim 1, wherein the mathematical formula represents the insertion probability as an increasing function of the first estimated cache miss cost.

8. A method of inserting cache blocks into a cache queue, comprising:
    calculating an estimated cache miss cost for a cache block within the cache queue;
    evicting the cache block from the cache queue;
    inserting an entry for a storage block corresponding to the cache block into a shadow list corresponding to the cache queue;
    detecting, by a processor, a cache miss for the cache queue referencing the storage block;
    accessing, in response to the cache miss, the entry within the shadow list;
    calculating, based on a mathematical formula of a plurality of estimated old cache miss costs for cache blocks evicted from the cache queue, an estimated cache miss cost threshold; and
    inserting, in response to the estimated cache miss cost exceeding the estimated cache miss cost threshold, a new cache block corresponding to the storage block into the cache queue.

9. The method of claim 8, wherein calculating the estimated cache miss cost threshold comprises:
    calculating the plurality of estimated old cache miss costs;
    identifying a maximum estimated old cache miss cost of the plurality of estimated old cache miss costs;
    calculating a standard deviation of the plurality of estimated old cache miss costs; and
    calculating, based on the maximum estimated old cache miss cost and the standard deviation, the estimated cache miss cost threshold.

10. The method of claim 8, wherein calculating the estimated cache miss cost for the cache block comprises:
    calculating, for the cache block, an estimated access rate based on a number of cache hits received since insertion into the cache queue divided by a time elapsed since insertion into the cache queue; and
    calculating the estimated cache miss cost based upon a latency of the cache block multiplied by the estimated access rate.

11. A computer readable storage medium storing a plurality of instructions for inserting cache blocks into a cache queue, the plurality of instructions comprising functionality to:
    detect a cache miss for the cache queue;
    identify a storage block receiving an access in response to the cache miss;
    calculate a first estimated cache miss cost for a first storage container comprising the storage block;
    calculate, based on a mathematical formula of the first estimated cache miss cost, an insertion probability for the first storage container;
    randomly select an insertion probability number from a uniform distribution, wherein the insertion probability exceeds the insertion probability number; and insert, in response to the insertion probability exceeding the insertion probability number, a new cache block corresponding to the storage block into the cache queue.

12. The computer readable storage medium of claim 11, wherein calculating the first estimated cache miss cost comprises:
    calculating, for the first storage container, an average number of cache hits received by a plurality of cache blocks corresponding to the first storage container in a first passage through a probationary segment of the cache queue;
    identifying a latency of the first storage container; and
    calculating, based on the average number of cache hits and the latency, the first estimated cache miss cost.

13. The computer readable storage medium of claim 11, wherein the plurality of instructions further comprise functionality to:
    calculate a plurality of estimated cache miss costs for a plurality of storage containers having cache blocks in the cache queue, wherein the plurality of estimated cache miss costs comprises the first estimated cache miss cost and the plurality of storage containers comprises the first storage container; and
    identify a maximum estimated cache miss cost of the plurality of estimated cache miss costs, wherein the insertion probability is further based on the maximum estimated cache miss cost.

14. The computer readable storage medium of claim 11, wherein the plurality of instructions further comprise functionality to:
    identify, within the cache queue, a previous new cache block storing a value of a previous storage block;
    calculate a second estimated cache miss cost for a second storage container comprising the previous storage block;
    calculate, based on a mathematical formula of the second estimated cache miss cost, a removal probability for the second storage container;
    randomly select a removal probability number from the uniform distribution, wherein the removal probability exceeds the removal probability number; and
    evict, in response to the removal probability exceeding the removal probability number and prior to inserting the new cache block into the cache queue, the previous new cache block from the cache queue.

15. The computer readable storage medium of claim 11, wherein the plurality of instructions further comprise functionality to:
    calculate an estimated arrival rate of new cache blocks for the first storage container, wherein the insertion probability is further based on the estimated arrival rate.

16. A system for inserting cache blocks, comprising:
    a cache queue, comprising:
        a probationary segment at an end of the cache queue, and
        a protected segment adjacent to the probationary segment; and
    a cache manager executing on a processor and configured to:
        detect a cache miss for the cache queue;
        identify a storage block receiving an access in response to the cache miss;
        calculate an estimated cache miss cost for a storage container comprising the storage block;
        calculate, based on a mathematical formula of the estimated cache miss cost, an insertion probability for the storage container;
        randomly select a probability number from a uniform distribution, wherein the insertion probability exceeds the probability number; and
        insert, in response to the insertion probability exceeding the probability number, a new cache block corresponding to the storage block into the cache queue at a beginning of the probationary segment.

17. The system of claim 16, further comprising:
    a shadow list corresponding to the cache queue, comprising:
        a plurality of entries for evicted cache blocks;
    wherein the cache manager is further configured to:
        evict, prior to inserting the new cache block, a victim cache block from the cache queue; and
        insert an entry for the victim cache block into the shadow list.

18. The system of claim 16, further comprising:
    a storage device comprising the storage container, wherein the storage container comprises a plurality of storage blocks, and wherein the plurality of storage blocks comprises the storage block.

19. The system of claim 16, wherein calculating the estimated cache miss cost comprises:
    calculating an average number of cache hits received by a plurality of cache blocks corresponding to the first storage container in a first passage through a probationary segment of the cache queue;
    identifying a latency of the first storage container; and
    calculating, based on the average number of cache hits and the latency, the first estimated cache miss cost.

* * * * *

UNITED STATES PATENT AND TRADEMARK OFFICE
CERTIFICATE OF CORRECTION

| | | |
|---|---|---|
| PATENT NO. | : 8,601,217 B2 | Page 1 of 1 |
| APPLICATION NO. | : 13/007553 | |
| DATED | : December 3, 2013 | |
| INVENTOR(S) | : Swart et al. | |

It is certified that error appears in the above-identified patent and that said Letters Patent is hereby corrected as shown below:

In the Specification

In column 26, line 1, delete "and or" and insert -- and/or --, therefor.

In column 26, line 30, delete "." and insert -- , --, therefor.

Signed and Sealed this
Tenth Day of June, 2014

Michelle K. Lee
*Deputy Director of the United States Patent and Trademark Office*